(12) United States Patent
Rieder et al.

(10) Patent No.: US 7,665,370 B2
(45) Date of Patent: Feb. 23, 2010

(54) VIBRATION-TYPE MEASURING TRANSDUCER HAVING CONNECTING LINES SECURED POINTWISE TO THE TRANSDUCER HOUSING

(75) Inventors: Alfred Rieder, Landshut (DE); Michael Fuchs, Eschbach (DE); Leonhard Probst, Hochwald (CH); Michael Wiesmann, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 31 days.

(21) Appl. No.: 12/000,934

(22) Filed: Dec. 19, 2007

(65) Prior Publication Data

US 2008/0223149 A1  Sep. 18, 2008

Related U.S. Application Data

(60) Provisional application No. 60/877,130, filed on Dec. 27, 2006, provisional application No. 60/877,131, filed on Dec. 27, 2006, provisional application No. 60/877,132, filed on Dec. 27, 2006.

(30) Foreign Application Priority Data

Dec. 22, 2006 (DE) ............ 10 2006 062 185

(51) Int. Cl.
*G01F 1/84* (2006.01)
(52) U.S. Cl. .................. 73/861.357; 73/861.355
(58) Field of Classification Search ................. 73/861.355–861.357
See application file for complete search history.

(56) References Cited

U.S. PATENT DOCUMENTS 4,955,239 A * 9/1990 Cage et al. ............. 73/861.355

(Continued)

FOREIGN PATENT DOCUMENTS

| WO | WO 87/01444 | 3/1987 |
|---|---|---|
| WO | WO 00/042393 | 7/2000 |

*Primary Examiner*—Harshad Patel
(74) *Attorney, Agent, or Firm*—Bacon & Thomas, PLLC

(57) ABSTRACT

The measuring transducer includes: a measuring tube vibrating, at least at times, during operation and serving for conveying a medium, wherein the measuring tube communicates with a pipeline via an inlet tube piece at an inlet end and an outlet tube piece at an outlet end; a counteroscillator, which is affixed to the measuring tube on the inlet end to form a first coupling zone and affixed to the measuring tube on the outlet end to form a second coupling zone; a sensor arrangement secured, at least in part, to the counteroscillator for registering oscillations at least of the measuring tube; an exciter mechanism secured, at least in part, to the counteroscillator for driving at least the measuring tube; a transducer housing affixed to the inlet tube piece and the outlet tube piece; and connection lines, especially connection lines for the exciter mechanism and/or for the sensor arrangement, of which connection lines at least one is secured at least sectionally along the counteroscillator and secured at least pointwise thereto, as well as to the transducer housing. The connection lines are routed essentially symmetrically with respect to a principal axis of inertia of the inner part formed by means of measuring tube and counteroscillator, especially mirror-symmetrically with respect to at least one principal axis of inertia of the counteroscillator, whereby an essentially symmetrical damping force per unit length can be assured in the measuring transducer.

31 Claims, 6 Drawing Sheets

U.S. PATENT DOCUMENTS

| | | |
|---|---|---|
| 6,487,917 B1 | 12/2002 | Van Cleve |
| 6,634,241 B1 | 10/2003 | Van Cleve |
| 6,684,716 B2 | 2/2004 | Ohnishi |
| 6,769,163 B2 | 8/2004 | Van Cleve |
| 7,077,014 B2 * | 7/2006 | Rieder et al. ............ 73/861.357 |
| 7,472,607 B2 * | 1/2009 | Bitto et al. ............. 73/861.357 |
| 7,475,603 B2 * | 1/2009 | Bitto et al. ............. 73/861.357 |
| 7,490,521 B2 * | 2/2009 | Bitto et al. ............. 73/861.357 |
| 2006/0000293 A1 * | 1/2006 | Rieder et al. ............ 73/861.357 |
| 2007/0119264 A1 * | 5/2007 | Bitto et al. ............. 73/861.357 |
| 2007/0119265 A1 * | 5/2007 | Bitto et al. ............. 73/861.357 |
| 2007/0186685 A1 * | 8/2007 | Bitto et al. ............. 73/861.357 |
| 2008/0223150 A1 * | 9/2008 | Rieder et al. ............ 73/861.357 |
| 2008/0250871 A1 * | 10/2008 | Rieder et al. ............ 73/861.357 |

* cited by examiner

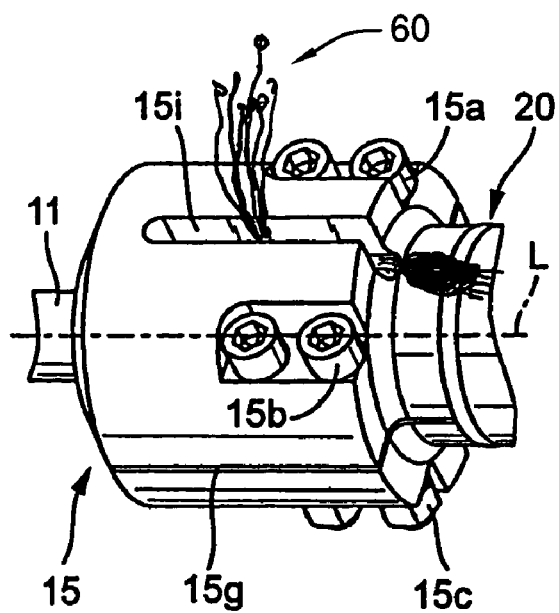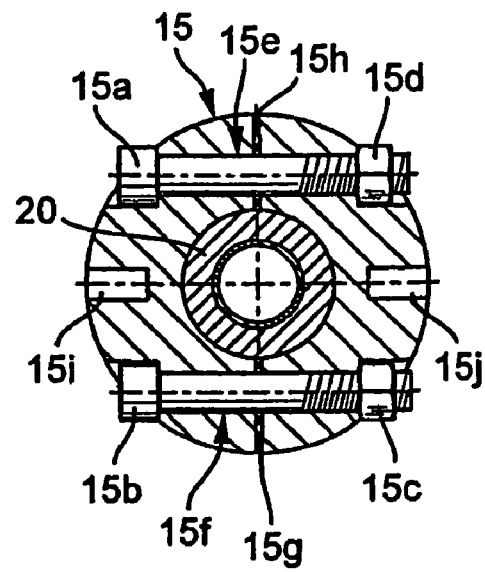
Fig. 7a  Fig. 7b
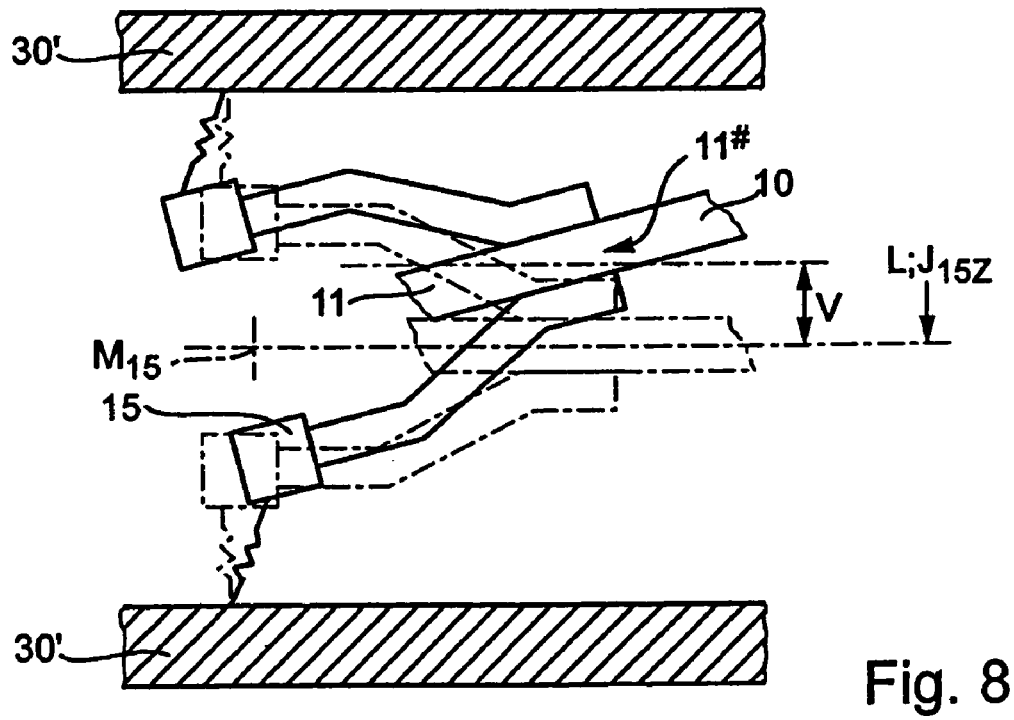
Fig. 8

VIBRATION-TYPE MEASURING TRANSDUCER HAVING CONNECTING LINES SECURED POINTWISE TO THE TRANSDUCER HOUSING

CROSS-REFERENCES

This application is a nonprovisional Application of U.S. Provisional Applications 60/877,130 filed on Dec. 27, 2006, 60/877,131 filed on Dec. 27, 2006, and 60/877,132 filed on Dec. 27, 2006 and claims the benefit of German applications 102006062185.9 filed on Dec. 22, 2006, 102006062219.7 filed on Dec. 22, 2006, and 102006062220.0 filed on Dec. 22, 2006.

FIELD OF THE INVENTION

The invention relates to a measuring transducer of vibration-type, especially one suited for use in a Coriolis mass-flow meter.

BACKGROUND OF THE INVENTION

For determining parameters, for example a mass flow (e.g. mass flow rate), a density, a viscosity, etc., of media, for example liquids and/or gases, flowing in a pipeline, often inline measuring devices are used, especially inline measuring devices embodied as Coriolis mass flow meters, which by means of a measuring transducer of vibration-type and a control and evaluation electronics connected thereto, induce forces, for example Coriolis forces, in the flowing medium and produce, derived from these forces, a measurement signal representing the at least one parameter. Such inline measuring devices with a measuring transducer of vibration type have been known for a long time and have established themselves well in industrial application. Thus, for example in EP-A 317 340, U.S. Pat. Nos. 5,398,554, 5,476,013, 5,531,126, 5,691, 485, 5,705,754, 5,796,012, 5,945,609, 5,979,246, 6,006,609, 6,397,685, 6,691,583, 6,840,109, WO-A 99 51 946, WO-A 99 40 394 or WO-A 00 14 485, Coriolis mass-flow rheters are described, each with a measuring transducer of vibration-type. Each of the disclosed measuring transducers includes a single, straight measuring tube, which conveys the medium and vibrates during operation. Such measuring tube communicates with the pipeline via an inlet tube piece at its inlet end and an outlet tube piece at its outlet end. Each of the disclosed measuring transducers also includes: An exciter mechanism, which causes the measuring tube during operation, by means of at least one electromechanical, especially electrodynamic, oscillation exciter acting thereon, to oscillate with bending oscillations in a tube plane; and a sensor arrangement having oscillation sensors, especially electrodynamic oscillation sensors, for the at least point-wise registration of oscillations toward the inlet end and toward the outlet end of the measuring tube and for producing electrical sensor signals influenced by the mass flow. Additionally, each of the disclosed measuring transducers has a transducer housing encasing the measuring tube with counteroscillator coupled thereto and encasing also the provided exciter mechanism and sensor arrangement, especially a transducer housing affixed directly to the inlet tube piece and to the outlet tube piece. Besides the oscillation sensors provided for registering vibrations of the measuring tube, the measuring transducer can, as proposed also in, among others, EP-A 831 306, U.S. Pat. Nos. 7,040, 179, 5,736,653, 5,381,697 or WO-A 01/02 816, have yet other sensors arranged on the inner part and serving especially for registering perhaps secondary measured variables, such as e.g. temperature, acceleration, strain, stress, etc.

As is known, straight measuring tubes, when excited to bending oscillations of a first eigenoscillation form (the so-called driving-mode, or also, wanted-mode), effect Coriolis forces in the medium flowing through the measuring tube. These forces, in turn, lead to a superimposing, on the excited bending oscillations, of coplanar bending oscillations of a second form of eigenoscillation of higher and/or lower order (the so-called Coriolis mode), such that oscillations registered on the inlet and outlet sides of the measuring tube exhibit also a measurable phase difference dependent on the mass flow. Usually the measuring tubes of such measuring transducers, especially those used in Coriolis mass-flow meters, are excited in the driving-mode to an instantaneous resonance frequency of the first eigenoscillation form, especially at oscillation amplitude controlled to be constant. Since this resonance frequency is especially also dependent on the instantaneous density of the medium, it is possible also by means of Coriolis mass-flow meters common in the market to measure, besides mass flow, also the density of flowing media.

An advantage of straight measuring tubes is that; for example, they can be emptied with a high degree of certainty completely in practically any installation orientation. Especially is this also true after a cleaning process performed inline. Additionally, such measuring tubes are, in comparison e.g. to omega-shaped or helically-shaped measuring tubes, essentially easier and accordingly more cost-favorably manufacturable. A further advantage of a straight measuring tube vibrating in the above described manner is, in comparison to bent measuring tubes, also to be seen e.g. in the fact that, during measurement operations via the measuring tube, practically no torsional oscillations are evoked in the connected pipeline. On the other hand, a significant problem of the above-described measuring transducers lies in the fact that, because of the alternating lateral deflections of the vibrating, single measuring tube, oscillating transverse forces of the same frequency can be caused to act on the pipeline. To this point in time, these transverse forces have only been able to be compensated to a very limited extent and only with a very high technical effort.

For improving the dynamic balance of the measuring transducer, especially for reducing transverse forces caused by the vibrating, single measuring tube acting at its inlet and outlet ends on the pipeline, the measuring transducers disclosed in EP-A 317 340, U.S. Pat. Nos. 5,398,554, 5,531,126, 5,691, 485, 5,796,012, 5,979,246, 6,006,609, 6,397,685, 6,691,583, 6,840,109 or WO-A 00 14 485 include in each case a counteroscillator embodied as one or more pieces and affixed to the measuring tube on the inlet end, accompanied by the formation of a first coupling zone, and affixed to the measuring tube on the outlet end, accompanied by the formation of a second coupling zone. Such counteroscillators, which are implemented in the form of a beam or especially in tubular form or as a body pendulum aligned with the measuring tube, oscillate during operation out of phase with the measuring tube, especially with opposite phase, whereby the effect of the lateral transverse forces and/or transverse impulses brought about in each case by the measuring tube and the counteroscillator on the pipeline can be minimized and in some cases also completely suppressed.

In the case of commonly marketed measuring transducers having a single measuring tube and a counteroscillator coupled thereto, the oscillation exciter of the exciter mechanism is formed by means of: At least one coil, which is usually affixed to the counteroscillator, and has current flowing through it, at least at times, and a magnetic field passing through it, at least at times; and an armature affixed to the measuring tube and interacting with the at least one coil. In the case of most measuring transducers of the described kind, the oscillation sensors of the sensor arrangement are constructed on the same principle as the aforementioned oscillation exciter. Accordingly, also the oscillation sensors of such a sensor arrangement are, most often, each formed by means of: At least one coil, which is usually affixed to the counteroscillator, and has current flowing through it, at least at times, and a magnetic field passing through it, at least at times; and an armature affixed to the measuring tube and interacting with the at least one coil. Each of the aforementioned coils is, additionally, connected with the mentioned operating and evaluating electronics of the inline measuring device by means of at least one pair of electrical connection lines. The connection lines are usually guided on the shortest possible path from the coils via the counteroscillator to the transducer housing.

Measuring transducers of the described kind having a single measuring tube and counteroscillator have proven themselves, especially in the case of those applications wherein the medium to be measured has an essentially constant density or a density which changes to only a very slight degree, thus, for those applications in which a net force acting on the attached pipeline, resulting from the transverse forces produced by the measuring tube and the counterforces produced by the counteroscillator, can initially be set, without more, assuredly to zero. In contrast, those measuring transducers, especially those disclosed in U.S. Pat. No. 5,531,126 or U.S. Pat. No. 5,969,265, in the case of applications with media having densities fluctuating over wide ranges, especially in the case of different media following one after the other, and even when to only a slight degree, exhibit practically the same disadvantage as measuring transducers without counteroscillators, since the above-mentioned net resultant forces are also dependent on the density of the medium and consequently can be different from zero to a considerable degree. Stated differently, also the inner part of the measuring transducer formed by at least the measuring tube and the counteroscillator is globally deflected during operation out of an assigned static rest position, due to density dependent imbalances and transverse forces associated therewith.

A possibility for reducing density dependent, transverse forces is described e.g. in U.S. Pat. Nos. 5,287,754, 5,705,754, 5,796,010 or 6,948,379. In the case of the measuring transducers shown there, the more middle, or high, frequency, oscillatory, transverse forces produced on the part of the vibrating, single measuring tube are kept away from the pipeline by means of an, in comparison to the measuring tube, very heavy counteroscillator, and, as required, a relatively soft coupling of the measuring tube to the pipeline, thus, in practical terms, by means of a mechanical low pass filter. A great disadvantage of such a measuring transducer is, among other things, however, that the counteroscillator mass required for achieving a sufficiently robust damping increases more than proportionately with the nominal diameter of the measuring tube. On the other hand, when using such a massive counteroscillator, one must assure that a minimum eigenfrequency of the measuring transducer (which becomes ever lower with increasing mass) still lies far from the likewise very low eigenfrequencies of the attached pipeline. Different, farther-reaching possibilities for reduction of the density dependent, transverse forces are proposed e.g. in U.S. Pat. Nos. 5,979,246, 6,397,685, 6,691,583, 6,840,109, WO-A 99 40 394 or WO-A 00 14 485. In the case of the disclosed compensation mechanisms presented there, of essential concern is the expanding of a bandwidth, within which counteroscillator and offset sections are effective, by providing a suitable interaction of the individual components of the inner parts of the measuring transducers. In particular, in U.S. Pat. No. 6,397,685, a measuring transducer of the aforementioned kind is disclosed, wherein a first balancing mass is provided as a mass balancing measure for the exciting oscillation and is connected with the counteroscillator in the longitudinal-axis-perpendicular, central plane of the counteroscillator (which is embodied as a compensation cylinder). Then, second and third balancing masses are provided as a mass balancing measure for the Coriolis oscillation. The second and third balancing masses are embodied as end regions of the counteroscillator. In this manner, it is to be achieved that the inner part composed of the measuring tube and the compensation cylinder is at least largely balanced with respect to mass both for the exciting oscillations of the measuring tube as well as also for the Coriolis oscillations of the Coriolis measuring tube. WO-A 00 14 485 also describes a measuring transducer of vibration-type for a medium flowing in a pipeline. In this case, provided are: An inlet end, first cantilever, which is coupled with the measuring tube in the region of a third coupling zone lying between the first and second coupling zones and which has a center of mass lying in the region of the measuring tube; and an outlet end, second cantilever, which is coupled with the measuring tube in the region of a fourth coupling zone lying between the first and second coupling zones and which has a center of mass lying in the region of the measuring tube. Each of the two cantilevers is provided for executing balancing oscillations, which are so developed that the transverse impulses are compensated, and, consequently, a center of mass of an inner part formed of measuring tube, exciter mechanism, sensor arrangement and the two cantilevers is held locationally fixed. Furthermore, WO-A 99 40 394 describes a measuring transducer of the aforementioned kind in which a first cantilever serving for producing counterforces acting against the transverse forces at the inlet ends, as well as a second cantilever serving for producing counterforces acting against the transverse forces on the outlet end are provided. In such case, the first cantilever is affixed both to the measuring tube in the region of the first coupling zone and also to the transducer housing at the inlet end, and the second cantilever is affixed both to the measuring tube in the region of the second coupling zone, as well as also to the transducer housing on the outlet end, such that the counterforces are so developed that the measuring tube is kept fixed in an assigned, static rest position, despite the produced transverse forces. Finally, in U.S. Pat. Nos. 6,691,583 and 6,840,109, measuring transducers are in each case disclosed, wherein, in each case, a first cantilever fixed in the region of the first coupling zone essentially rigidly to the measuring tube, counteroscillator and inlet tube piece and a second cantilever fixed in the region of the second coupling zone essentially rigidly to the measuring tube, counteroscillator, and outlet tube piece are provided. The two cantilevers, especially ones arranged symmetrically about the middle of the measuring tube, serve here for producing in the inlet and outlet tube pieces bending moments dynamically, when the vibrating measuring tube together with the counteroscillator and, as a result, also the two coupling zones are shifted laterally from their respectively assigned, static, rest positions, with the bending moments being so developed that, in the deforming inlet tube piece and in the deforming outlet tube piece, impulses are produced, which are directed counter to the transverse impulses produced in the vibrating measuring tube. The two cantilevers are so embodied and so arranged for this purpose in the measuring transducer that a center of mass of the first cantilever lying in the region of the inlet tube piece and a center of mass of the second cantilever lying in the region of the outlet tube piece both remain essentially locationally fixed in a static rest position despite the fact that the measuring tube has been shifted laterally out of its assigned static rest position. The basic principal of this compensation mechanism is to transform lateral displacement movements of the vibrating measuring tube, which would otherwise act in a disturbing manner on the measurements and/or on the connected pipeline and which are superimposed on its primary deformations effecting the measurement effects, into counter deformations of the inlet and outlet tube pieces acting in a dynamically balancing manner in the measuring transducer, in order to largely eliminate the lateral deflection movements. By a suitable tuning of the inner part, the deformations of the inlet and outlet tube pieces can be so developed that the transverse impulses largely compensate one another, independently of the instantaneous oscillation amplitudes and/or frequencies of the measuring tube. In corresponding manner, it is thus possible also essentially to compensate the transverse forces produced by the vibrating measuring tube by means of transverse forces produced by the deforming inlet tube piece and the deforming outlet tube piece.

Investigations on measuring transducers of the described kind have, however, shown, that, despite the inner part, as discussed above, being almost perfectly mechanically balanceable, even in the case of fluctuating density, still considerable disturbances can arise in the oscillation measurement signals. Especially, it has been found, firstly, that these disturbances are not only of equal frequency to the oscillations of the measuring tube, but also that these disturbances unfortunately also present themselves directly in the phase difference essential for the mass flow measurement and, consequently, can lead to a not inconsiderable corruption of the measurement result. Additionally, these disturbances can arise in rather non-reproducible, and, as a result, without extra effort, unpredictable, manner. Accompanying this, a subsequent, for example even algorithmic, compensation of these disturbances of the measurement signals is practically impossible. More extensive investigations have additionally shown, that the disturbances of the aforementioned kind are caused, at least mediately, by the above-mentioned connection lines.

Further, it has been found, that, especially in the sections of the connection lines, which extend practically freely suspended between the inner part and the transducer housing, interference voltages, or currents, can be induced directly in the connection lines, when the inner part is oscillating. These interference voltages, or currents, are induced due to movements of the individual connection lines relative to one another, leading to changes with time of the capacitive and inductive line- and/or stray-impedances.

Moreover, it has been discovered, that, in the case of conventional routing of the connection lines, for example, along a section of the counteroscillator, then over a freely suspended segment between two tie-down points for each of the connection lines, to the transducer housing, alone due to the damping effect of the relatively thin, moved wires and insulations of the lines, there will be imposed on each of the two sensor signals an additional phase-shift, and, indeed, in a manner changing the phase difference; this happens, in particular, also despite effective suppression of fluctuating-density-caused, lateral displacements of the inner part, formed by means of the measuring tube and counteroscillator, relative to the transducer housing. In other words, the connection line influences the zero-point of the measuring transducer to such an extent that, even in the case where the measuring tube of the measuring transducer is not flowed through by medium, a mass flow different from zero would be, erroneously, detected. Making the situation even more difficult, these zero-point displacements caused by the connection lines depend in quite significant measure on the operating-temperature and/or -duration of the measuring transducer.

In connection with the disturbances caused by the connection lines, especially the aforementioned freely suspended segment has turned out to be an interference-causing, and, thus, for accuracy of measurement, neuralgic region, such being true, surprisingly, even for inner parts with a relatively massive and heavy, counteroscillator. Thus, in the aforementioned region, inner part and transducer housing are mechanically coupled together; and while this mechanical coupling is perhaps weak, nevertheless, for the aforementioned zero-point stability, it is not insignificant. By the relative movement of the two tie-down points in each case intercepting the freely suspended line sections, the thereby necessarily deformed and/or moved line sections bring about their damping action, in such case, unfortunately in a manner such that the phase difference between the two sensor signals is changed. It was possible, in such case, it is true, to determine that, by joining the connection lines to form a cable harness, along with placing of the one of the aforementioned tie-down points near an oscillation node of the above-mentioned Coriolis mode, thus practically at the center of the counter oscillator, a certain lessening of the disturbances can be achieved. However, it was, unfortunately, also determined, that the aforementioned zero-point error again is of considerable degree at just a very small departure from the perfectly central position, for instance even at the order of magnitude of manufacturing and/or mounting tolerances, and, associated therewith, at only a small eccentricity of the effective damping force or also a small asymmetry of a damping force burden relative to the mentioned oscillation node; this is true even more so in the case of a counteroscillator oscillating with considerable amplitude.

Finally, the aforementioned freely suspended segment is, because of the high number of cycles of the inner part over the total operating time, also a mechanically highly loaded part of the connection lines, so that a corresponding selection of fatigue-resistant materials for the line wires and insulation, as well as appropriate material thicknesses, are required. Accordingly, the connection lines can, both for electrical reasons and for reasons of mechanical strength, not be kept arbitrarily thin, and, along therewith, cannot be made mechanically insignificant as regards the zero-point error.

SUMMARY OF THE INVENTION

An object of the invention is, therefore, to improve the character of the holding and routing of the connection lines for measuring transducers of vibration type to the effect that the damaging influence of the connection lines on the accuracy of measurement of such measuring transducers, especially on their zero-points, can be largely suppressed or at least clearly minimized.

For achieving the object, the invention resides in a measuring transducer of vibration-type for a medium flowing in a pipeline, which measuring transducer includes: A measuring tube, which vibrates, at least at times, during operation and which serves for conveying the medium, with the measuring tube communicating with the pipeline via an inlet tube piece at an inlet end and an outlet tube piece at an outlet end; a counteroscillator, which is affixed to the measuring tube on the inlet end for forming a first coupling zone and to the measuring tube on the outlet end for forming a second coupling zone; a first cantilever coupled in the first coupling zone to the inlet tube piece and to the measuring tube and having a center of mass lying in the region of the inlet tube piece; and a second cantilever coupled in the second coupling zone to the outlet tube piece and to the measuring tube and having a center of mass lying in the region of the outlet tube piece; a sensor arrangement held, at least partly, at the counteroscillator for registering oscillations at least of the measuring tube; an exciter mechanism held, at least partly, at the counteroscillator for driving at least the measuring tube; a transducer housing affixed to the inlet tube piece and to the outlet tube piece; as well as connection lines, especially connection lines for the exciter mechanism and/or for the sensor arrangement, of which connection lines at least two are secured at least sectionally along the counteroscillator and secured at least pointwise thereto, as well as to the transducer housing. Moreover, it is provided in the case of the measuring transducer of the invention, that the connection lines are routed along the counterosicilator essentially symmetrically, at least with reference to a principal axis of inertia of the inner part formed by means of the measuring tube and counteroscillator, and especially mirror-symmetrically with reference at least to a principal axis of inertia of the counteroscillator.

Additionally, the invention resides in an inline measuring device, especially one embodied as a Coriolis mass flow measuring device, density measuring device, viscosity measuring device or the like, for measuring and/or monitoring at least one parameter, for example a mass flow, a density and/or a viscosity, of a medium flowing in a pipeline, in which inline measuring device, a measuring transducer of the above-defined kind is located.

In a first embodiment of the invention, it is provided that a section of each of the connection lines extends freely suspended between two mutually spaced, tie-down points pointwise affixing each connection line, of which a first tie-down point is arranged on the inner part of the measuring transducer and a second tie-down point is arranged on the transducer housing. In a further development of this embodiment of the invention, it is further provided that the section of the at least one connection line extending between the two tie-down points is routed essentially freely suspended and/or that the section of the at least one connection line extending between the two tie-down points is secured essentially free, especially lastingly, of tensile stresses. In such case, it can be of advantage to arrange the two tie-down points such that a relative distance therebetween remains essentially unchanged, even when the measuring tube is vibrating.

In a second embodiment of the invention, it is provided that at least the at least one connection line secured to the cantilever is routed in other portions of its extent also along an inner wall surface of the transducer housing and is affixed at least pointwise thereto.

In a third embodiment of the invention, it is provided that the measuring tube and counteroscillator laterally oscillate during operation, at least at times and/or at least in part, in a driving-mode, in which they execute essentially coplanar, bending oscillations in a common, imaginary plane of oscillation. In a further development of this embodiment of the invention, it is additionally provided that the connection lines are affixed to the counteroscillator, at least in part, outside of the common plane of oscillation of measuring tube and counteroscillator.

In a fourth embodiment of the invention, it is provided that the measuring tube executes during operation, at least at times, bending oscillations about a bending oscillation axis connecting the two coupling zones with one another.

In a first further development of the fourth embodiment of the invention, it is additionally provided that also the counteroscillator executes during operation, at least at times, bending oscillations about a bending oscillation axis, and wherein the at least one connection line secured between the two tie-down points is affixed to the counteroscillator, at least in part, especially predominantly, along a neutral fiber of the counteroscillator essentially non-distorting during bending oscillation of the counteroscillator.

In a second further development of the fourth embodiment of the invention, it is additionally provided that the measuring tube is essentially straight.

In a third further development of the fourth embodiment of the invention, it is additionally provided that measuring tube and counteroscillator are directed essentially coaxially with one another.

In a fourth further development of the fourth embodiment of the invention, it is additionally provided that the measuring tube executes, at least at times during operation, torsional oscillations about a torsional oscillation axis essentially parallel to, especially coinciding with, the bending oscillation axis.

In a fifth further development of the fourth embodiment of the invention, it is additionally provided that the measuring transducer further includes a first cantilever coupled with the measuring tube on an inlet side of the measuring tube, as well as a second cantilever coupled with the measuring tube on an outlet side of the measuring tube.

In a sixth further development of the fourth embodiment of the invention, it is additionally provided that the first cantilever has a center of mass lying in the region of the inlet tube piece and the second cantilever has a center of mass lying in the region of the outlet tube piece.

In a seventh further development of the fourth embodiment of the invention, it is additionally provided that each of the two cantilevers executes, at least at times during operation, rotary oscillations about a rotational axis extending essentially transversely to the bending oscillation axis.

In an eighth further development of the fourth embodiment of the invention, it is additionally provided that each of the two cantilevers executes, due to lateral movements of the coupling zones, rotary oscillations about an axis of rotation extending essentially transversely to the bending oscillation axis. Especially, the rotary oscillations are, in such case, so developed that each of the two cantilevers has at least one rest point or a quiet region surrounding such, which remains essentially locationally fixed in an associated static rest position, even in the case of laterally moving coupling zones and/or which essentially maintains a relative distance to a region of the transducer housing removed both from the inlet tube piece and from the outlet tube piece.

In a ninth further development of the fourth embodiment of the invention, it is additionally provided that a section of each of the connection lines extends freely suspended between two mutually spaced tie-down points pointwise affixing such connection line, of which a first tie-down point is arranged on the cantilever and a second tie-down point is arranged vis-à-vis on the transducer housing.

In a tenth further development of the fourth embodiment of the invention, it is additionally provided that the connection lines are affixed, at least in part, adhesively to the cantilever.

In a fifth embodiment of the invention, the measuring transducer further includes at least one temperature sensor affixed to the counteroscillator, as well as connection lines therefor.

In a sixth embodiment of the invention, the exciter mechanism includes at least one coil, as well as connection lines therefor. Advantageously, the at least one coil of the exciter arrangement is coupled mechanically, especially rigidly, with the counteroscillator.

In a seventh embodiment of the invention, the sensor arrangement includes a coil, as well as connection lines therefor. Advantageously, the at least one coil of the sensor arrangement is mechanically coupled, especially rigidly, with the counteroscillator.

In an eighth embodiment of the invention, the measuring transducer further includes at least one temperature sensor affixed to the measuring tube and/or at least one strain sensor affixed to the measuring tube, as well as connection lines therefor.

In a ninth embodiment of the invention, it is provided that at least the at least one connection line secured between the two tie-down points carries electrical current, at least at times, during operation.

In a tenth embodiment of the invention, it is provided that all of the connection lines are secured to one of the two cantilevers.

In an eleventh embodiment of the invention, it is provided that either at least one of the connection lines is secured to each of the two cantilevers or that none of the connection lines is secured to one of the two cantilevers.

In a twelfth embodiment of the invention, it is provided that the measuring tube is encased, at least partly, by the counteroscillator.

In a thirteenth embodiment of the invention, it is provided that the counteroscillator is essentially tubular.

In a fourteenth embodiment of the invention, it is provided that measuring tube, inlet tube piece and outlet tube piece are formed by segments of a single, one-piece tube.

In a fifteenth embodiment of the invention, it is provided that each of the cantilevers is affixed, at least in part, directly to the counteroscillator.

In a sixteenth embodiment of the invention, it is provided that each of the cantilevers is formed by means of a sleeve inserted onto the counteroscillator.

In a seventeenth embodiment of the invention, it is provided that each of the two cantilevers has a mass, which is at least equal to the mass of the counteroscillator.

In an eighteenth embodiment of the invention, it is provided that each of the two cantilevers has a mass, which is smaller than 5-times the mass of the counteroscillator.

In a nineteenth embodiment of the invention, it is provided that each of the two cantilevers is formed essentially tubularly or sleeve-shaped. In a further development of this embodiment of the invention, it is further provided that each of the cantilevers has a greatest wall thickness, which is greater than a greatest wall thickness of the counteroscillator. In another variant, each of the cantilevers can additionally also have a smallest wall thickness, which is greater than a greatest wall thickness of the counteroscillator.

In a twentieth embodiment of the invention, it is provided that inlet tube piece and outlet tube piece are essentially straight. In a further development of this embodiment of the invention, it is further provided that inlet tube piece and outlet tube piece are directed essentially in alignment with one another as well as with a longitudinal axis of the measuring transducer connecting the two coupling zones.

In a twenty-first embodiment of the invention, it is provided that the first cantilever has a first mass moment of inertia about a first axis of rotation lying in the first coupling zone, as well as a second mass moment of inertia about a second axis of rotation essentially parallel to the longitudinal axis of the measuring tube, and that the second cantilever has a first mass moment of inertial about an axis of rotation essentially parallel to the first axis of rotation and lying in the second coupling zone, as well as a second mass moment of inertia about a second axis of rotation essentially parallel to the longitudinal axis of the measuring tube. In a further development of this embodiment of the invention, it is additionally provided that a ratio of the first mass moment of inertia of each cantilever to its second mass moment of inertia is smaller than 5, especially smaller than 2, and/or each of the two first mass moments of inertia is at least 0.01 kg·m$^2$ and/or each of the two second mass moments of inertia is at least 0.01 kg·m$^2$ and/or that a quotient of the first mass moment of inertia of each cantilever to its respective mass is smaller than 0.03 m$^2$, especially lying in a range between 0.001 m$^2$ and 0.01 m$^2$, and/or that a ratio of the quotients of the first cantilever as well as also a ratio of the quotients of the second cantilever, to a cross sectional area of the measuring tube $A_{10}$ is smaller than 10.

A basic idea of the invention is to improve the zero-point stability of the measuring transducer by routing the connection lines along the counteroscillator, especially on a neutral fiber thereof essentially non-deformed during operation, and essentially symmetrically, especially mirror-symmetrically, with reference to at least one principal axis of inertia—for example one running essentially perpendicularly to a longitudinal axis of the measuring tube and/or the counteroscillator. Additionally, it can, at least in the case of connection lines with relatively thick insulation and/or in the case of counteroscillator oscillating with large amplitude, be of advantage to shift the tie-down point for each of the connection lines, where these are secured mechanically effectively to the inner part, into such regions of the inner part as are moved scarcely, or to a negligible degree, relative to one another during operation and so have a very small influence on the zero-point of the measuring transducer. It was possible, additionally, to determine that the coupling zones and/or the cantilevers coupled to the measuring tube are especially suited therefor. This is true, because, among other reasons, these regions of the inner part are moved little, or even not at all, during operation, especially even in the face of fluctuating density of the medium being measured. Additionally, the inner part can be advantageously also so dimensioned and tuned, that at least the cantilevers have quiet points, which, despite laterally moved coupling zones, for example because of varying density of the medium, essentially remain in rest positions assigned during installation.

BRIEF DESCRIPTION OF THE DRAWINGS

The invention and further advantages will now be explained on the basis of an example of an embodiment, as presented in the figures of the drawing. Equal parts are provided in the figures with equal reference characters. In case indicated for reasons of crowding or the like, already mentioned reference characters are omitted in subsequent drawings. The figures of the drawing show as follows:

FIGS. 7a, b in different, partially sectioned views, an embodiment of an end-situated cantilever of a measuring transducer of FIG. 2; and FIG. 8 schematically, a portion of the measuring transducer with a measuring tube vibrating according to FIG. 6c.

DETAILED DESCRIPTION OF EXEMPLARY EMBODIMENTS

Figure 1:
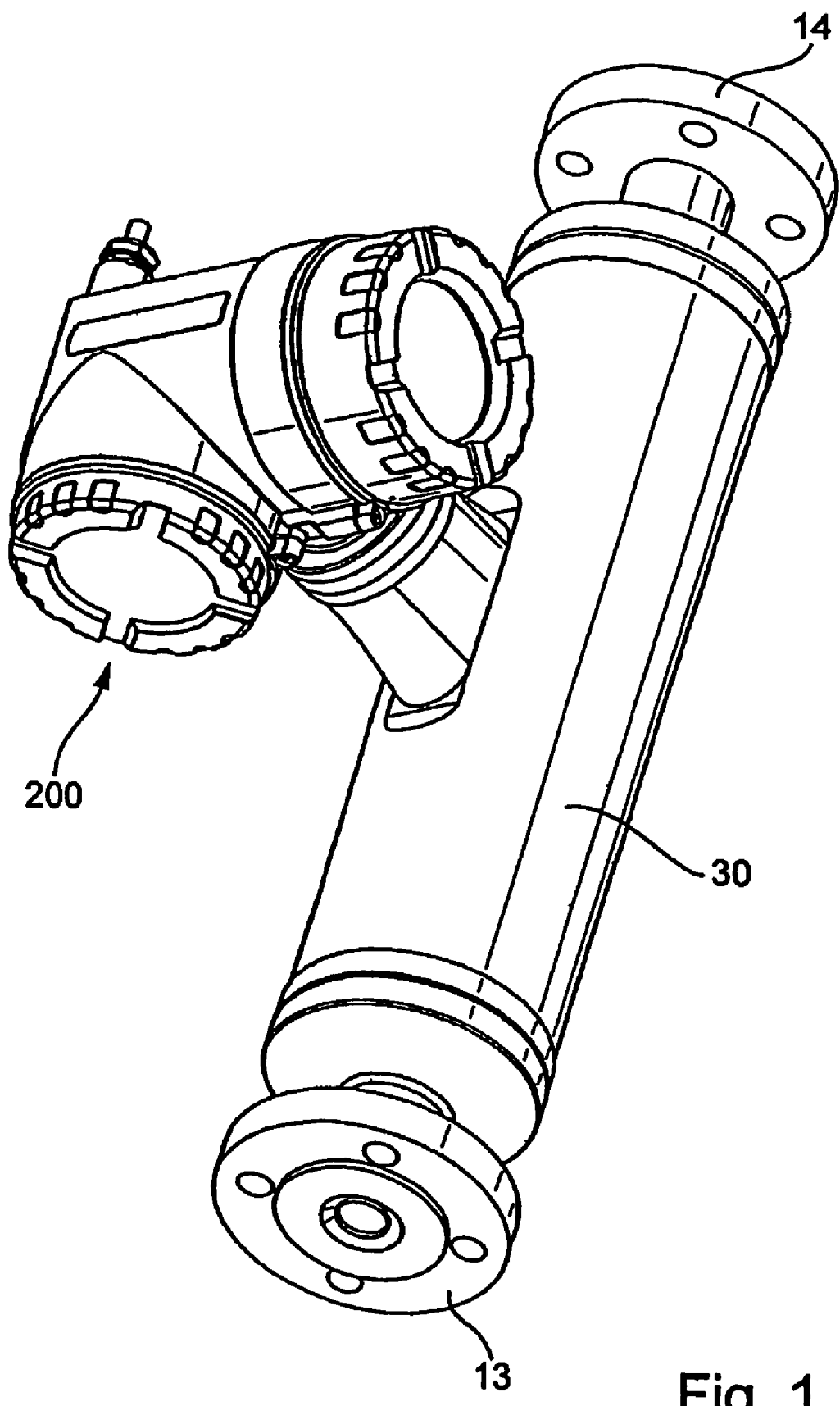
FIG. 1 an inline measuring device joinable into a pipeline for measuring at least one parameter of a medium conveyed in the pipeline.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Shown in FIG. 1 is an inline measuring device insertable into a pipeline (not shown), for example, as a Coriolis mass flow measuring device, a density measuring device, a viscosity measuring device, or the like, which serves for measuring and/or monitoring at least one parameter, for example, a mass flow rate, a density, a viscosity, etc., of a medium flowing in the pipeline. The inline measuring device includes for such purpose a measuring transducer of vibration-type, through which the medium to be measured flows during operation. The measuring transducer is electrically connected to an operating and evaluation electronics (not shown) of the inline measuring device accommodated in a corresponding electronics housing 200. FIGS. 2-5 schematically show corresponding examples of embodiments of such measuring transducers of vibration-type. Moreover, the principal mechanical construction as well as its manner of operation are comparable with those of the measuring transducers disclosed in U.S. Pat. No. 6,691,583 or U.S. Pat. No. 6,840,109. The measuring transducer serves for producing, in the medium flowing therethrough, mechanical reaction forces, e.g. mass flow dependent, Coriolis forces, density dependent, inertial forces, and/or viscosity dependent, frictional forces, which react measurably, especially sensorially registerably on the measuring transducer. Derived from these reaction forces, e.g. a mass flow rate m, a density $\rho$ and/or a viscosity $\eta$ of the medium can be measured in the manner known to those skilled in the art.

For the conveying of the medium, the measuring transducer includes, in the illustrated example of an embodiment, a single, essentially straight, measuring tube, which is caused to vibrate during operation, and, as a result, is repeatedly elastically deformed as it oscillates about a static, rest position. For minimizing disturbing influences acting on the measuring tube, as well as for reducing the transfer of oscillatory energy from the measuring transducer to the connected pipeline, there is additionally provided in the measuring transducer a counteroscillator 20 extending in this case essentially parallel to the measuring tube 10. This is, as shown in FIG. 3, affixed to the measuring tube 10, such that there is formed at the inlet side at a first coupling zone 11# and at the outlet side a second coupling zone 12#. The first and second coupling zones define, for practical purposes, respectively, an inlet end of the measuring tube 10 and an outlet end of the measuring tube 10. The counteroscillator 20 can be of tubular form or box shape and can be connected with the measuring tube, for example, in such a way at the inlet end and at the outlet end that it is directed essentially coaxially with the measuring tube 10, such as is shown by a comparison of FIGS. 2 and 3, whereby the counteroscillator 20 surrounds the measuring tube 10. Additionally, the counteroscillator 20 is designed in the present example of an embodiment to be significantly heavier than the measuring tube 10.

For enabling the medium to be measured to flow through the measuring tube, the measuring tube 10 is connected to the pipeline (not shown), which brings the medium and then carries it away, via an inlet tube piece 11 at the inlet end in the region of the first coupling zone and via an outlet tube piece 12 at the outlet end in the region of the second coupling zone. The outlet tube piece 12 may, especially, be essentially identical to the inlet tube piece 11. Inlet tube piece 11 and outlet tube piece 12 are essentially straight in the illustrated example of an embodiment and are directed in alignment with one another, with the measuring tube 10 and with an imaginary longitudinal axis L connecting, for practical purposes, the coupling zones. According to an embodiment of the invention, a length, $L_{11}$, of the inlet tube piece 11, as well as a length, $L_{12}$, of the outlet tube piece 12, are in each case at most 0.5 times a length, $L_{10}$, of the measuring tube 10. In order to be able to provide a measuring transducer which is as compact as possible, both the inlet tube piece 11 and the outlet tube piece 12 have their respective lengths, $L_{11}$ and $L_{12}$, smaller, in each case, than 0.4 times a length, $L_{10}$, of the measuring tube 10.

The inner part of the measuring transducer formed by the measuring tube 10, the counteroscillator 20, the inlet tube piece 11, the outlet tube piece 12, as well as the two cantilevers 15, 16, is, as evident from a comparison of FIGS. 1 and 3, further held oscillatably in a transducer housing 30 surrounding the inner part tightly against escape of medium and largely pressure tightly, as well. Transducer housing 30 is correspondently affixed to the ends of the inlet and outlet tube pieces 11, 12 far from the coupling zones. For the case in which the measuring transducer is to be mounted releasably with the pipeline, first and second flanges 13, 14 are, in each case, formed on the inlet tube piece 11 and the outlet tube piece 12. The flanges 13, 14 can, in such case, at the same time, also be embodied as integral components of the transducer housing 30. In case required, the inlet and outlet tube pieces 11, 12 can, however, also be connected directly with the pipeline, e.g. by means of welding or brazing.

For producing the individual components of the aforementioned inner part, practically any usual material used for such measuring transducers such as e.g. steel, titanium, tantalum, zirconium, etc., or also appropriate combinations of these materials can be used. For example, use of titanium for measuring tube 10 as well as for the inlet tube piece 11 and the outlet tube piece 12, has proven to be especially suitable. While, for example, for reasons of cost savings, both for the counteroscillator 20 and the cantilever 15, 16, as well as also for the transducer housing 30, use of steel is of advantage. In order to enable as simple as possible and cost-favorable manufacture of the cantilevers, as well as, finally, the measuring transducer, each of the two cantilevers 15, 16 can, for example, be embodied essentially tubularly or sleeve-shaped, so that they can be formed essentially by means of sleeves, especially metal sleeves, inserted onto the counteroscillator, especially for the case when the counteroscillator 20 has already been connected with the measuring tube. According to a further development of such, each of the sleeves forming in such case the respective cantilevers 15, 16 has at least one annular groove. As is evident from a comparison of FIGS. 2 and 3, each of the, at least two, annular grooves in the case of the present example of an embodiment is oriented essentially coaxially, especially concentrically, with a principle axis of inertia of the respective cantilevers 15, 16 extending essentially parallel to the longitudinal axis L. Alternatively to the use of the aforementioned sleeves for the cantilevers 15, 16, these can, however, also be manufactured together with the counteroscillator 20 as one piece by means of a single tubular stock or by means of two tube halves in a two-piece embodiment.

Figure 6A:
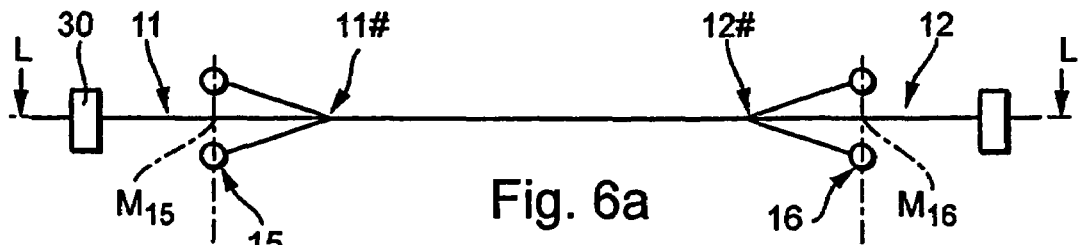
FIGS. 6*a* to *d* schematically, bending lines of the measuring tube and a counteroscillator oscillating in a lateral, bending oscillation mode.
Figure 6B:
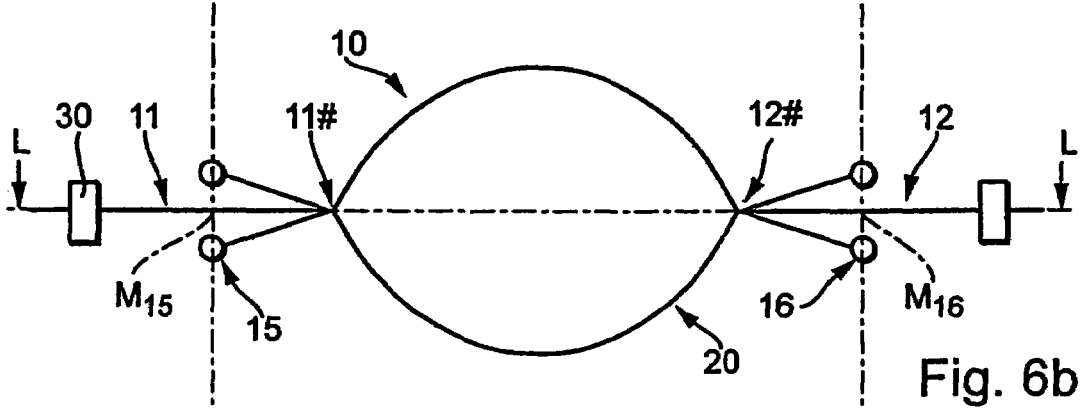
Figure 6C:
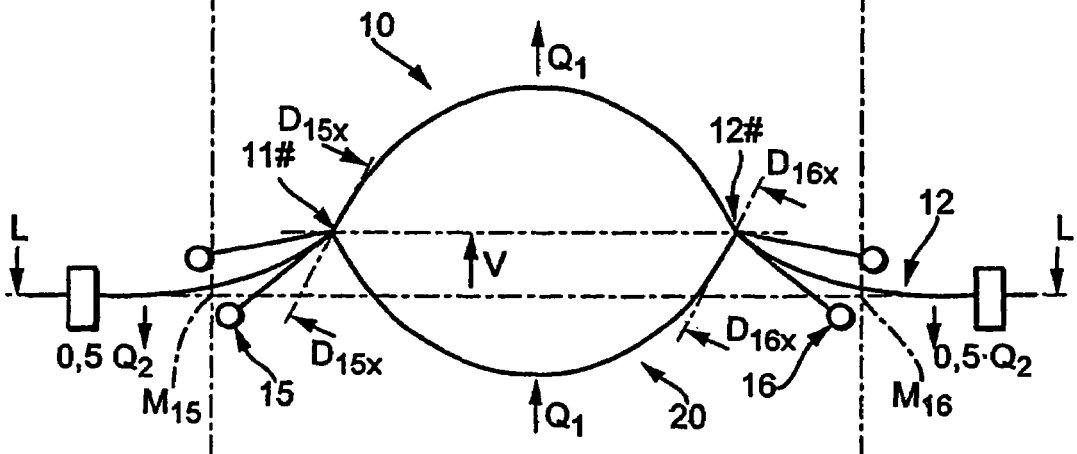
Figure 6D:
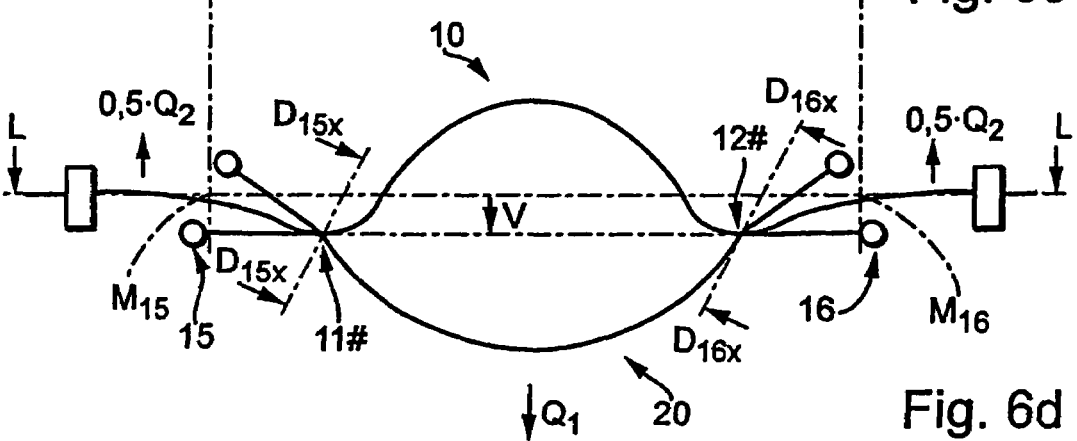

In operation of the measuring transducer, the measuring tube 10, as already mentioned at the beginning, is so excited, at least at times, to lateral bending oscillations, especially in the region of a natural resonance frequency, that it flexes in this so-called driving-mode (also called wanted mode) essentially according to a natural first form of eigenoscillation. The bending oscillations are in such case essentially transverse to a bending oscillation axis essentially parallel with, especially coinciding with, the longitudinal axis L and extending between the two coupling zones 11#, 12#. In an embodiment of the invention, the measuring tube 10 is in such case excited with an oscillation frequency, $f_{exc}$, which corresponds as accurately as possible to a natural resonance frequency of the so-called f1-eigenmode of the measuring tube 10, thus, a symmetric eigenmode, in which, as schematically shown in FIGS. 6b through 6d, the vibrating measuring tube 10, which, however, does not have medium flowing through it, is essentially symmetrically deflected with respect to a central axis perpendicular to the longitudinal axis, and, in such case, has essentially a single oscillation antinode. Equally, also the counteroscillator 20 is, as shown schematically in FIG. 6b also excited during operation of the measuring transducer likewise to bending oscillations, which are developed essentially coplanarly, however, in essentially opposite phase to the bending oscillations of the measuring tube 10. Thus, measuring tube and counteroscillator oscillate during operation, at least at times and/or in part, laterally in a driving-mode, in which they execute essentially coplanar bending oscillations in a common plane of oscillation.

For the case in which the medium is flowing in the pipeline and consequently the mass flow rate is different from zero, Coriolis forces are induced in the medium flowing through the tube, by means of the measuring tube 10 vibrating in the aforementioned manner. These forces in turn react on the measuring tube 10 and thus cause an additional, sensorially registerable deformation (not, however, shown here) of the measuring tube 10 according to a natural second form of eigenoscillation, which is essentially coplanarly superimposed on the excited driving-mode. The instantaneous character of the deformation of the measuring tube 10 is in such case, especially as regards its amplitudes, also dependent on the instantaneous mass flow m. Serving as the second eigenoscillation form, the so-called Coriolis mode can be, as usual in the case of such measuring transducers, e.g. the eigenoscillation form of the antisymmetric f2-eigenmode; thus, that with two oscillation antinodes and/or the eigenoscillation form of the antisymmetric f4-eigenmode having four oscillation antinodes.

According to an embodiment of the invention, furthermore, measuring tube 10 and counteroscillator 20 are so dimensioned that the empty measuring tube 10 has a lowest natural eigenfrequency, $f_{10}$, which is greater than or about equal to a lowest natural eigenfrequency, $f_{20}$, of the counteroscillator 20. Especially, measuring tube 10 and counteroscillator 20 are, in such case, so dimensioned that the measuring tube, 10 when filled with water, has a lowest natural eigenfrequency, $f_{10, H2O}$, which is at least equal to a lowest natural eigenfrequency, $f_{20}$, of the counteroscillator 20. According to another embodiment of the invention, it is further provided that measuring tube 10 and counteroscillator 20 are so tuned to one another as regards their oscillation characteristics that a lowest natural eigenfrequency, $f_{10, H2O}$, of the measuring tube 10 corresponds also then at least to 1.1 times a lowest natural eigenfrequency, $f_{20}$, of the counteroscillator 20 when it is completely filled with water. In the case of a measuring tube 10 of titanium having a nominal diameter DN of about 55 mm, a length, $L_{10}$, of about 570 mm and a wall thickness of about 2.5 mm, a natural resonance frequency, $f_{10, Air}$, of the f1-eigenmode of the empty measuring tube would lie at about 550 Hz, while a natural resonance frequency, $f_{10, H2O}$, of the f1-eigenmode of the measuring tube filled with water would amount to about 450 Hz.

According to a further embodiment of the invention, measuring tube 10 and counteroscillator 20 are further so dimensioned for such purpose that a mass, $m_{20}$, of the counteroscillator 20 corresponds at least to 5-times a mass, $m_{10}$, of the measuring tube 10. In the case of a tube made of steel having an outer diameter of about 100 mm and a wall thickness of about 10 mm and taking into consideration the measuring tube dimensioned in the aforementioned manner, the counteroscillator 20 would have a mass, $m_{20}$, in the order of magnitude of about 10 kg.

In a further development of the invention, the measuring tube 10, especially in the case of a measuring transducer fashioned as shown in U.S. Pat. No. 6,840,109, executes, during operation, at least at times, torsional oscillations about a torsional oscillation axis essentially parallel with, especially coinciding with, the longitudinal axis L, or the aforementioned bending oscillation axis. Torsional oscillation axis, bending oscillation axis, as well as also the longitudinal axis L, can coincide, this being quite usual in the case of such measuring transducers. For the above described measuring tube 10, for example, a lowest natural resonance frequency for the torsional oscillations would lie in the region of about 750 Hz.

For producing mechanical oscillations of the measuring tube 10, be they bending oscillation and/or torsional oscillations, the measuring transducer further includes an exciter mechanism 40, especially an electrodynamic exciter mechanism. This serves for converting the exciter energy $E_{exc}$, fed by means of the operating and evaluating electronics and having a controlled current and/or a controlled voltage, into an exciter force $F_{exc}$, acting on the measuring tube 10 e.g. as pulses or harmonically, and elastically deforming measuring tube 10 in the aforementioned manner. The exciter force $F_{exc}$ can, in such case, as shown schematically in FIG. 4, be developed bidirectionally or, however, also only unidirectionally, and can, in the manner known to those skilled in the art, for instance by means of a current and/or voltage control circuit, be adjusted with respect to its amplitude and, e.g. by means of a phase-control loop, with respect to its frequency.

The exciter mechanism can be e.g. a simple solenoid arrangement acting differentially on the measuring tube 10 and the counteroscillator 20, with a cylindrical exciter coil mechanically, especially rigidly, coupled to the counteroscillator 20 and through which a corresponding exciter current flows during operation and with a permanent magnet armature plunging at least partly into the exciter coil and being fixed externally, especially centrally, to the measuring tube 10. Additionally, the exciter mechanism 40 can e.g. be implemented as an electromagnet or as e.g. shown in WO-A 99 51 946, as a seismic exciter. For detecting oscillations of the measuring tube 10 e.g. a sensor arrangement usual for such measuring transducers can be used, in the case of which, in manner known to those skilled in the art, by means of an inlet side, first sensor 50A and by means of an outlet side, second sensor 50B, the movements of the measuring tube 10 are registered and converted into corresponding first and second sensor signals $S_1$, $S_2$. Used as sensors 50A and 50B can be e.g.

electrodynamic velocity sensors differentially measuring the oscillations relative to the counteroscillator, or electrodynamic path sensors or acceleration sensors. Instead of electrodynamic sensor arrangements or in supplementation of the same, further sensors measuring by means of resistive or piezoelectric strain gauges or optoelectronic sensors can serve for detecting the oscillations of the measuring tube 10.

Figure 2:
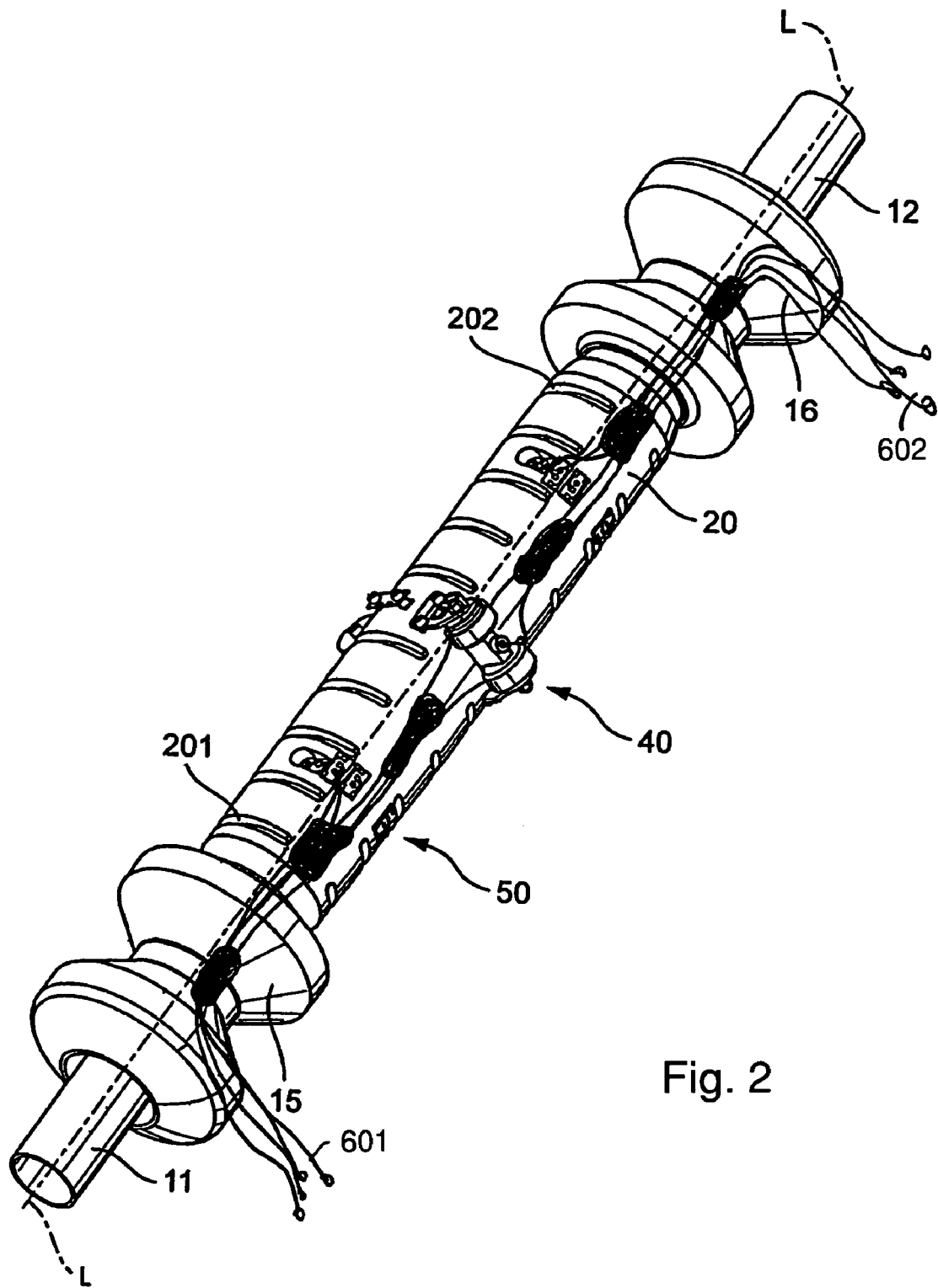
FIG. 2 in a perspective, side view, an example of an embodiment of a measuring transducer of vibration-type suited for the inline measuring device of FIG. 1 and having a measuring tube, a counteroscillator, and end-situated cantilevers.
Figure 3A:
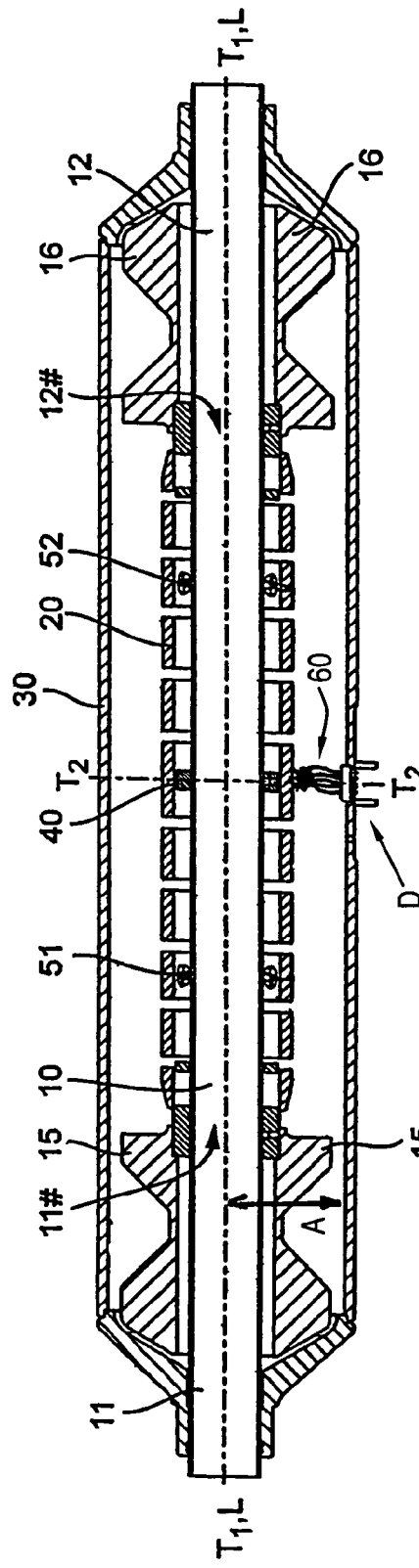
FIGS. 3*a*, *b* sectioned in two different side views, the measuring transducer of FIG. 2.
Figure 3B:
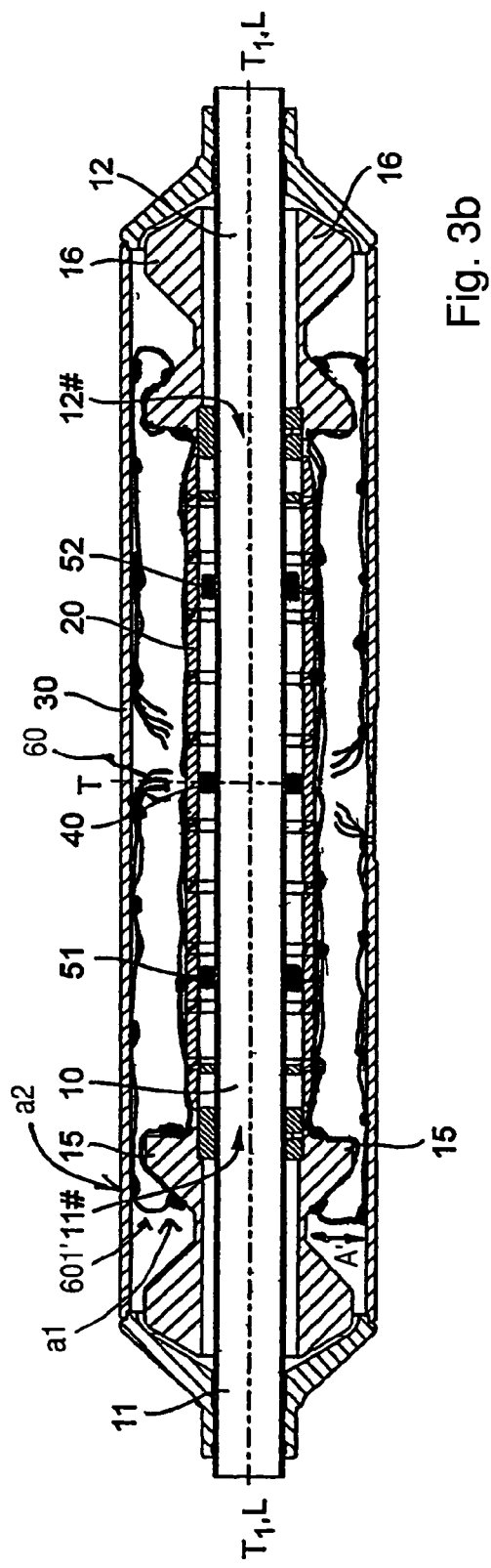
Figure 5:
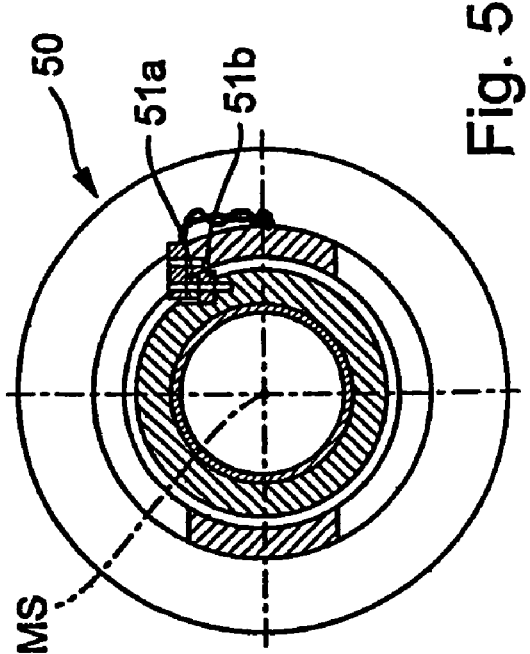
FIG. 5 in a second cross section, the measuring transducer of FIG. 2.
Figure 4:
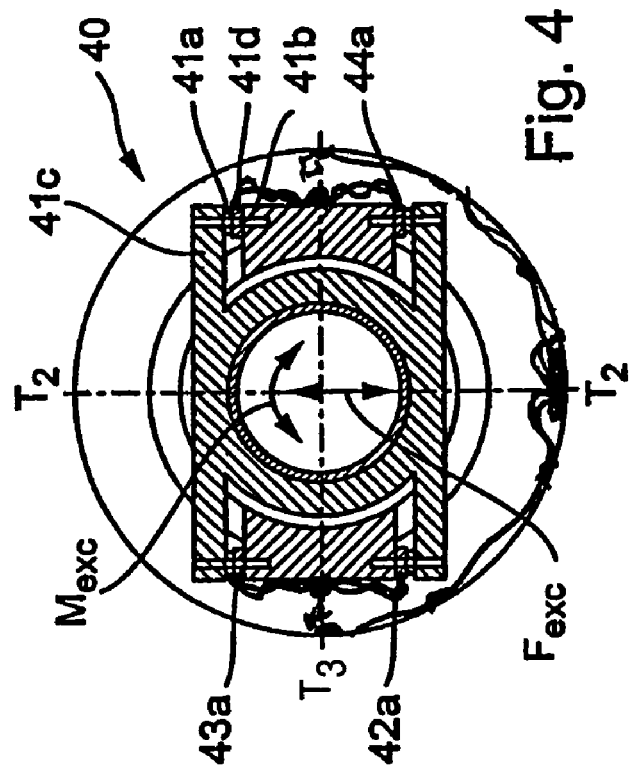
FIG. 4 in a first cross section, the measuring transducer of FIG. 2.

In a further embodiment of the invention, the exciter mechanism 40 is, as also shown in FIGS. 2 to 4, so constructed and so arranged in the measuring transducer that the exciter mechanism 40 acts during operation simultaneously, especially differentially, on both measuring tube 10 and counteroscillator 20. In the example of an embodiment shown in FIG. 4, the exciter mechanism 40 has for such purpose at least a first exciter coil 41a, which in operation is flowed through, at least at times, by the exciter current or an exciter current component. Exciter coil 41 is affixed to a lever 41c connected with the measuring tube 10. Via the lever and an armature 41b affixed externally to the counteroscillator 20, exciter mechanism 40 acts differentially on the measuring tube 10 and the counteroscillator 20. This arrangement has, among other things, also the advantage that, on the one hand, the counteroscillator 20 and, consequently, also the transducer housing 100 can be kept small in cross section and, in spite of this, the exciter coil 41a is easily accessible, especially also during assembly. Moreover, another advantage of this embodiment of the exciter mechanism 40 lies in the fact that possibly used coil cups 41d, especially ones no longer negligibly heavy at nominal widths of above 50 mm, are likewise affixable to the counteroscillator 20 and, therefore, have practically no influence on the resonance frequencies of the measuring tube 10. It is to be noted, however, here that, in case required, the exciter coil 41a can also be secured to the counteroscillator 20 and in such case the armature 41b is secured to the measuring tube 10.

In corresponding manner, also the sensor arrangement 50 can be so designed and arranged in the measuring transducer that it registers the vibrations of measurement tube 10 and counteroscillator 20 differentially. In the example of an embodiment shown in FIG. 5, the sensor arrangement 50 includes a sensor coil 51a affixed to the measuring tube 10 and arranged here outside of all principle axes of inertia of the sensor arrangement 50. Sensor coil 51a is arranged as close as possible to an armature 51b affixed to the counteroscillator 20 and is so magnetically coupled with this that a variable measurement voltage is induced in the sensor coil as a function of rotational and/or lateral, relative movements between measuring tube 10 and counteroscillator 20 changing their relative position and/or their relative separation. On the basis of such an arrangement of the sensor coil 51a, it is possible, in advantageous manner, to register simultaneously both the aforementioned torsional oscillations, as well as also the possibly excited bending oscillations. In case required, the sensor coil 51a can, for such purpose, however, also be affixed to the counteroscillator 20 and in corresponding manner the armature 51b coupled therewith is then affixed to the measuring tube 10.

In a further embodiment of the invention, it is additionally provided that oscillation exciter and oscillation sensors are constructed according to the same principle of action, and, especially, that they are constructed essentially to have equal structures. Furthermore, it is also an available option to secure coil and/or armature of the exciter mechanism and/or sensor arrangement directly to the measuring tube or to the counteroscillator, without using any intermediate levers.

For connecting the exciter mechanism as well as also the sensor arrangement to the mentioned operating- and evaluating-electronics of the inline measuring device, there are, furthermore provided, corresponding connection lines 60, which are routed, at least sectionally, within the transducer housing and convey during operation, at least at times, electrical current. The connection lines can, in such case, be embodied, at least in part, as electrically conductive wires encased, at least sectionally, by an electrical insulation, especially conductive wires having an average cross sectional diameter of smaller than 2 mm (for example, in an order of magnitude between 0.5 mm and 1.2 mm), e.g. in the form of twisted lines, so-called "twisted-pair" cable, ribbon cable and/or coaxial cable. Alternatively thereto or in supplementation thereof, the connection lines can, at least sectionally, also be formed by means of conductive traces of an, especially flexible, possibly lacquered, circuit board. Additionally, the connection lines can, for example in the case of use of optical oscillation sensors, in part, also be formed of optical fiber cable conveying light, at least at times, during operation.

In an embodiment of the invention, it is further provided that the connection lines 60 are routed, at least in part, sectionally along the counteroscillator and secured thereon, at least pointwise. In a further development of the invention, it is additionally provided that the connection lines routed along the counteroscillator and secured thereon are affixed to the counteroscillator adhesively. The connection lines can, in such case, be advantageously so affixed that they are embedded in an electrically insulating layer 70 coated onto the counteroscillator and composed of adhesive material, which is fracture-resistant in sufficient degree and also elastic. This layer 70 can be, for example, essentially continuous, or, as indicated in FIG. 2, sectionally interrupted. The embedding enables, on the one hand, that, in very simple manner, a stable, lasting affixing of the connection line 60 can be created. On the other hand, in the case of using an electrically insulating material for the embedding layer, an electrically comparatively less resistant material can be selected for the insulating of the line, or even bare wire can be used as connection lines. The layer 70 for affixing the connection lines can be here, for example, an appropriately applied glass or glass solder, ceramic, enamel or a plastics compound. Examples of plastics compounds for affixing the connection lines to the counteroscillator include e.g. metal adhesives, resins or also silicone. For buffering possibly thermally related expansion of the counteroscillator, it can be of advantage to secure the connection lines at the counteroscillator 20 along curved paths, especially arc-shaped or meandering paths.

In the case of the measuring transducer of the invention, it is further provided that the connection lines are routed, at least relative to one of the principal axes of inertia T1, T2, T3 of the inner part formed by means of measuring tube and counteroscillator, essentially symmetrically, especially mirror-symmetrically, relative to a principal axis of inertia T1, T2, T3 of the counteroscillator, in order, in this way, to achieve an equally as symmetric as possible damping per unit line length along the inner part, or to prevent antisymmetries in the damping per unit line length due to damping forces in at least sectionally possibly moved connection lines. Axis of symmetry can be, in such case, for example, a principal axis of symmetry T2, and/or T3, of the inner part extending essentially perpendicular to a longitudinal axis T1 of the inner part, and, thus also, of the measuring tube and/or the counteroscillator.

As evident from FIGS. 2 and 3b, the connection lines are routed further to a feedthrough D provided in the transducer housing. Feedthrough D is made of glass, ceramic and/or a plastic. From the feedthrough D, the connection lines extend further to the mentioned operating and evaluating electronics of the inline measuring device. In doing this, a section of each of the connection lines 60 runs between two tie-down points, of which a first time-down point a1 is located on the inner part carrying the connection line and a second tie-down point a2 is located on the transducer housing. The section of the connection lines extending between the associated two tie-down points is advantageously essentially freely suspended, and, indeed, as much as possible such that it is kept essentially, especially lastingly, free of tensile stresses. Depending on the locations of the two tie-down points, it can additionally be necessary to route one or another connection line also along the inner surface of the transducer housing 30 and to affix such at least pointwise thereto.

For the above-described case wherein also the counteroscillator executes, at least at times, and to a considerable extent, bending oscillations about a bending oscillation axis, in a further embodiment, it is additionally provided that the connection lines 60 secured to the counteroscillator 20 are routed at least partially, especially predominantly, along a neutral fiber of the counteroscillator essentially undistorted when the counteroscillator is executing bending oscillations and are correspondingly affixed thereto. This has, among other things, the advantage that the affected connection lines, on the one hand, move relatively little and are thus little mechanically loaded and, on the other hand, mechanically react only slightly on the inner part.

As already mentioned above a number of times, in the case of an exciting of the driving-mode vibrating in the above described manner in the single measuring tube 10, accompanying transverse forces $Q_1$ are known to be produced due to the mass accelerations accompanying the bending oscillations; in this way also laterally directed transverse impulses occur in corresponding manner in the measuring transducer. For example, in the case of an oscillation amplitude of about 0.03 mm, a transverse force of about 100 N would occur in the case of the above mentioned high-grade steel measuring tube. For the case in which these transverse forces can not be compensated, this leads to the fact that the inner part of the measuring transducer suspended on the inlet tube piece 11 and the outlet tube piece 12 is correspondingly pushed laterally out of its assigned static rest position. Along therewith, as shown schematically in FIGS. 6c and d, also the coupling zones 11#, 12# are, in the case of vibrating measuring tube, are moved, at least at times, out of a static rest position.

Accordingly, the transverse forces $Q_1$ would act by way of the inlet and outlet tube pieces 11, 12 at least partially on the connected pipeline and the pipeline would, therefore, likewise, be caused to vibrate. As earlier explained, measuring tube 10 can also be counterbalanced by means of the counteroscillator 20 practically only for a single value of the density of the medium and at best dynamically over a very narrow range of density of the medium; compare FIG. 6b. Thus, in the case of fluctuating density ρ of the medium, the measuring tube 10, and, as a result, practically the entire inner part, is laterally shifted out of the rest position symbolized in FIGS. 6a to d by the longitudinal axis L, and, indeed, in the case of lower density ρ beneath the density value of the medium, in the direction of its own oscillatory movement, as schematically shown in FIG. 6c, or, in the case of higher density above the mentioned value of the density of the medium, in the direction of the oscillatory movement of the counteroscillator 20 as schematically shown in FIG. 6d. As a result, the counteroscillator 20 serves more toward dynamically counterbalancing the measuring transducer for exactly one predetermined value of the density of the medium e.g. one to be expected most frequently during operation of the measuring transducer or also a critical value of the density of the medium, e.g. the density of water, to such an extent that the transverse forces $Q_1$ produced in the vibrating measuring tube are compensated as completely as possible and the measuring tube then does practically not leave its static rest position; compare FIGS. 6a, 6b. In order to enable an as practical and simple tuning as possible of the counteroscillator 20 to the mentioned value of the density of the medium as possible and to the then actually excited oscillatory form of the measuring tube 10, an embodiment of the invention provides for the adding, especially the releasable adding, of discrete mass pieces 201, 202 to the counteroscillator 20. The mass pieces 201, 202 can be e.g. disks screwed externally on protruding bolts affixed to the measuring tube, or short tubular pieces inserted onto the measuring tube 10. Additionally, a corresponding mass distribution can be implemented via the counteroscillator 20 e.g. also by the forming of longitudinal or annular grooves. A mass distribution suited for the particular application can, without more, be determined in manner known to those skilled in the art initially e.g. by means of finite element calculations and/or by means of experimental measurements. In case required, of course, also more than the shown two mass pieces 201, 202 can be used.

For further improved dynamic balancing of the measuring transducer, especially also in the case of media with significantly fluctuating density ρ, and also with a view to the decoupling principles for bending and/or torsional oscillations disclosed in U.S. Pat. No. 6,691,583 or U.S. Pat. No. 6,840,109, the cantilever 15 is essentially rigidly coupled to the inlet tube piece 11, counteroscillator 20, and measuring tube 10, and the cantilever 16 is essentially rigidly coupled to the outlet tube piece 12, counteroscillator 20, and measuring tube 10. In such case, the cantilevers 15, 16, which are especially arranged as close as possible to measuring tube 10, can be connected with the, in each case, other components of the inner part, for example, the counteroscillator 20, by material as well as also by shape and/or force connections. Accordingly, the cantilevers can e.g. be welded, soldered, brazed, clamped, and/or pressed in place. In this manner, by means of the cantilevers 15, 16, first mass moments of inertia $J_{15x}$, $J_{16x}$ are created acting equally eccentrically (thus not at the belonging centers of mass $M_{15}$, $M_{16}$) on the respective locations of securement. These first mass moments of inertia $J_{15x}$, $J_{16x}$ are not principle moments of inertia of the respective cantilevers 15, 16. By way of example, each of the cantilevers 15, 16 can, for such purpose, be affixed, at least in part, directly to the counteroscillator 20.

For the aforementioned case wherein the cantilevers 15, 16 are, in each case, to be clamped onto counteroscillator 20 and/or the associated connecting tube piece, they can be affixed e.g. also by means of corresponding threaded connections. Thus FIGS. 7a, b show, in the context of cantilever 15, an advantageous clamp connection for cantilevers of the described kind. The cantilever has, in such case, been affixed to the counteroscillator, following insertion thereon, by means of at least two, mutually parallel, traversing bolts 15, 15b and corresponding nuts 15c, 15d, with the two traversing bolts 15a, 15b being placed in traversing bores 15e, 15f located in mutually opposing sides in the cantilever 15. For preventing an unintentional loosening of the nuts 15c, 15d, these can, in case required, following assembly, additionally be connected with the respective traversing bolts in suitable manner, e.g. by means of metal adhesive, adhesively, and/or, e.g. by welding and/or brazing, materially. In order to assure a best possible, force-connection between cantilever 15 and counteroscillator 20 at acceptable clamping forces in the traversing bolts 15a, 15b and in the counteroscillator 20, the variant shown here additionally provides radially traversing, longitudinal slits 15g, 15h essentially aligned with the longitudinal axis L and situated on the surfaces turned toward the counteroscillator 20 and the measuring tube 20.

In the case of lateral movements of the two coupling zones 11#, 12#, for example due to density-dependent imbalances between measuring tube 10 and counteroscillator 20 and/or due to disturbance oscillations externally coupled into the measuring transducer, bending moments are produced in each case, thus, on the part of the cantilever 15, in the inlet tube piece 11 and, on the part of the cantilever 16, in the outlet tube piece 12, which, due to the eccentricity and the mass inertia of the cantilevers 15, 16, are so developed that deformations of the inlet and outlet tube pieces 11, 12 associated therewith are directed opposite to the lateral movements of the coupling zones 11#, 12#. In other words, the cantilevers 15, 16 are so formed and dimensioned that first mass moments of inertia $J_{15x}$, $J_{16x}$, resulting therefrom about respective imaginary rotational axes $D_{15x}$, $D_{16x}$, extending transversely to the longitudinal axis L but, however, spaced from a principle axis of inertia of the respective cantilevers parallel thereto do it is true allow a twisting of the cantilevers 15, 16 in the case of accelerated lateral displacement of the coupling zones 11#, 12#, but the, in each case, belonging centers of mass $M_{15}$, $M_{16}$, remain, at least laterally, essentially locationally fixed in those static rest position in each case assigned them on the basis of the concrete mechanical, geometrical properties of the cantilevers 15, 16. As a result, each of the centers of mass $M_{15}$, $M_{16}$ forms practically a point of rotation for the rotational movements of the cantilevers 15, 16 producing the bending moments. As a result of this, thus each of the two cantilevers executes, as a result of the lateral movement of the coupling zones, at least at times during operation, rotational oscillations about an axis $D_{15x}$, $D_{16x}$ of rotation, or, also, rotational oscillations, extending essentially transversely to the bending oscillation axis. As a result of this, thus each of the two cantilevers has at least one rest point, or, also, a rest region directly surrounding this, which remains, also in the case of laterally moved coupling zones 11#, 12#, essentially locationally fixed in a static rest position associated therewith and/or essentially keeps at least a relative distance A from a region of the transducer housing spaced from the inlet tube piece as well as also from the outlet tube piece.

The mass moments of inertia $J_{15}$, $J_{16}$, of the cantilevers 15, 16 acting eccentrically in the aforementioned manner on the respective locations of securement compel, therefore, (due to the pendulum-like motion about the respective practically locationally resting centers of mass $M_{15}$, $M_{16}$ resulting from the accelerated lateral shifting motions V of the measuring tube 10) an additional twisting of the respective associated locations of securement about the imaginary first axes of rotation $D_{15x}$, $D_{16x}$, perpendicular to this lateral shifting motion V, as well as to the longitudinal axis L, or, as the case may be, about the imaginary second axes of rotation $D_{15x}$, $D_{16x}$, essentially parallel to the first ones; compare FIGS. 6c and d. This twisting, as shown again enlarged in FIG. 8, practically of the entire inlet side first coupling zone 11#, especially of the inlet end, in turn effects, at least sectionally, an additional bending of the inlet tube piece 11 counter to the shifting movement V of the measuring tube 10, which corresponds practically to a uniaxial, transverse force free, and thus largely shear stress free bending; in analogous manner, the outlet tube piece 12 is likewise bent in opposite direction to the shifting motion V.

The two cantilevers 15, 16 are, as also shown in FIGS. 1 to 4, affixed on one side; thus, solely in the region of the coupling zones 11#, 12#. For suppressing possible undesired modes of oscillation, it is further possible, as shown schematically in FIG. 8, to provide spring and/or damping elements serving, however, additionally for the stabilizing of the centers of mass $M_{15}$, $M_{16}$ of the cantilevers 15 and 16 in their respective rest positions. These additional elements lie e.g. transversely to the main oscillation plane, or, as shown here, they lie essentially in the main oscillation plane, and are affixed, in each case, to the cantilever mass and to the transducer housing 30.

The dimensioning of the inner part including the measuring tube, the counteroscillator, the inlet and outlet pieces, as well as the cantilevers, plus the bendings of the inlet and outlet tube pieces 11, 12 influenced thereby, can be optimized e.g. by means of computer supported simulation calculations or by means of experimental measurements, such that counterforces $Q_2$ produced by the bending, completely, or at least largely, compensate the above mentioned transverse forces $Q_1$ in the vibrating measuring tube 10 over as wide a fluctuation range of density as possible, and, indeed, such that externally on the transducer housing 30 and consequently also on the connected pipeline practically no transverse forces arise caused by the vibrating measuring tube 10, or, as required, as caused also by the entire oscillating inner part. Possible deformations of the connected pipeline due to bending moments produced in this way can, for example, without more, be suppressed by an appropriately high bending stiffness of the transducer housing 30.

According to another embodiment of the invention, it is provided that the measuring tube 10 driven by the exciter mechanism is caused to vibrate during operation predominantly and/or at least at times with an oscillation frequency, $f_{exc}$, which corresponds at least to 1.5 times a lowest natural eigenfrequency of the oscillatable inner part of the measuring transducer, which as already indicated is formed at least by means of the measuring tube 10 itself, the counteroscillator 20, the inlet tube piece 11, the outlet tube piece 12, as well as the two cantilevers 15, 16. In other words, the natural resonance frequency of the driving-mode should correspond to at least 1.5 times and possibly, however, more than 2 times the lowest natural eigenfrequency of the inner part. For the here presented dimensioning of the inner part, its lowest natural eigenfrequency in the case of empty measuring tube would amount, for example, to about 250 Hz or less, while it would, in the case of a water filled measuring tube, lie in the order of magnitude of 200 Hz or lower.

Further investigations have now shown that this aforementioned requirement can be effectively realized, especially also while maintaining the decoupling principle disclosed in U.S. Pat. Nos. 6,691,583 or 6,840,109 and consequently, especially as compared to the measuring transducers disclosed in U.S. Pat. Nos. 6,691,583 or 6,840,109, considerable improvements as concerns disturbance resistance and, as a result, also the measurement accuracy of inline measuring devices of the described kind, can be achieved by so embodying each of the two cantilevers 15, 16 in such a manner that they have in comparison to the mass, $m_{10}$, of the measuring tube 10, a considerably larger mass, $m_{15}$, $m_{16}$, and indeed, at least in the order of magnitude of the mass, $m_{20}$, of the counteroscillator 20. Therefore, it is further provided in an embodiment of the measuring transducer of the invention that the counteroscillator 20 and the cantilevers 15, 16 are so dimensioned that the mass, $m_{15}$, $m_{16}$, of each of the two cantilevers 15, 16 is at least equal to a mass, $m_{20}$, of the counteroscillator 20. According to a further embodiment of the invention, each of the two cantilevers 15, 16, has a mass, $m_{15}$, $m_{16}$, which is greater than 1.5 times the mass, $m_{20}$, of the counteroscillator 20. Depending on the nominal diameter of the measuring tube being used, therefore, the mass, $m_{15}$, $m_{16}$, of each of the two cantilevers 15, 16, can, without more, be greater than 10 times the mass, $m_{10}$, of the measuring tube 10. Additionally, it was possible in this case to determine, further, that good results as regards the disturbance resistance can be achieved when each of the two cantilevers 15, 16, has a mass, $m_{15}$, $m_{16}$, which is smaller than 5 times the mass, $m_{20}$, of the counteroscillator 20 or which at least for the measuring tubes of greater nominal diameter above 50 mm, corresponds at most even only to 3 times the mass, $m_{20}$, of the counteroscillator 20.

According to a further embodiment of the invention, each of the cantilevers 15, 16, is so dimensioned that their respective masses, $m_{15}$, $m_{16}$, amount to more than 5 kg, especially more than 10 kg, and yet, however, is smaller than 50 kg.

In order to provide a sufficiently large mass, $m_{15}$, $m_{16}$, each of the cantilevers, in a further embodiment of the invention, is so constructed that it has at least a largest wall thickness, which is greater than a largest wall thickness of the counteroscillator. Additionally, in the presented example of an embodiment, each of the cantilevers 15, 16, is, however, also so dimensioned that it has a smallest wall thickness, which is greater than the largest wall thickness of the counteroscillator 20, whereby not only a correspondingly high mass, $m_{15}$, $m_{16}$, can be achieved but also an, in comparison to the measuring tube 10 and the counteroscillator 20, correspondingly high bending stiffness for each of the cantilevers 15, 16.

In a further embodiment of the invention, at least the measuring tube 10 and the cantilevers 15, 16, are so dimensioned to be matched to one another that the measuring tube 10 filled with water exhibits a lowest natural eigenfrequency, $f_{10, H20}$, for which at least the following holds:

$$f_{10} \geq \frac{1}{2\pi} \cdot \sqrt{\frac{12 \cdot E_{11} \cdot I_{11} / L_{11}^3}{m_{15}}},$$

wherein $E_{11}$ is the modulus of elasticity of the material of the inlet tube piece 11 and $I_{11}$ is an axial, areal moment of inertia of the inlet tube piece 11 effective, or average, for the oscillations of the inner part as defined above. This areal moment of inertia results in known manner on the basis of the relationship:

$$I_{11} = \frac{\pi}{64}[(DN + d)^4 - d^4].$$

In such case, the expression $E_{11} \cdot I_{11} / L_{11}^3$ corresponds essentially to the spring constant determined by the inlet tube piece 11 and, in the end, determinative for the oscillations of the inner part and which is, for practical purposes, also equal (at least for an essentially symmetric construction of the inner part) to the spring constant of the outlet tube piece 12 determined in analogous manner. As a result, the following relationship holds in the case of essentially symmetric construction:

$$\sqrt{\frac{E_{11} \cdot I_{11} / L_{11}^3}{m_{15}}} = \sqrt{\frac{E_{12} \cdot I_{12} / L_{12}^3}{m_{16}}}.$$

In a further embodiment, it is provided that, for the oscillation frequency, $f_{exc}$, with which the measuring tube 10 predominantly vibrates during operation at least at times, the following holds:

$$f_{exc} > \frac{1}{2\pi} \cdot \sqrt{\frac{12 \cdot E_{11} \cdot I_{11} / L_{11}^3}{m_{15}}}.$$

In this way, thus, the inlet and outlet tube pieces, as well as the masses, $m_{15}$, $m_{16}$, of the cantilevers 15, 16, are so matched to one another that already by them, a lowest natural eigenfrequency of the inner part is defined below that expected during operation for the oscillation frequency, $f_{exc}$, of the measuring tube dependent on the density of the medium to be measured.

In order to achieve this, as well as an, in spite thereof, as delay free as possible, twisting of the cantilevers 15, 16, and, as a result, a high band width of the decoupling mechanism, the cantilevers 15 and 16 are additionally so formed and affixed to the measuring tube 10 that a quotient of the aforementioned first mass moment of inertia, $J_{15x}$, $J_{16x}$, divided by the respective cantilever mass $m_{15}$ or $m_{16}$ is as small as possible. Experimental investigations have in such case additionally shown that, especially even in the case of the use of relatively heavy and, as a result, cantilevers 15, 16, which would be considered harder to get moving, of, for example, in each case, more than 10 kg, a relatively high disturbance resistance of the measuring transducer can be achieved, while, at the same time, keeping the same high dynamics when the quotient $J_{15x}/m_{15}$, $J_{16x}/m_{16}$ of the respective mass moments of inertia, $J_{15x}$, $J_{16x}$, of each cantilever 15, 16, to their respective masses, $m_{15}$, $m_{16}$, is kept smaller than 0.03 $m^2$, especially lying in a region between 0.001 $m^2$ and 0.01 $m^2$. Pursuing this further, it was possible, by investigating the oscillatory behavior of measuring transducers of the described kind of different nominal diameters, to determine that, as regards disturbance resistance and dynamics, good results can be achieved when a ratio of the aforementioned quotient $J_{15x}/m_{15}$, of the cantilever 15, as well as a ratio of the quotient $I_{16x}/m_{16}$, of the second cantilever 16, to a cross sectional area of the measuring tube $A_{10}$ (intended here is the areal content) is kept as small as possible, especially smaller than 10. Considering this situation, it is provided in a further embodiment of the invention that the cantilevers 15, 16, are in each case so embodied and dimensioned as a function of the nominal diameter DN of the measuring tube selected for the actual measuring transducer that the cantilever 15 fulfills at least the condition $$0.5 < \frac{J_{15x}}{m_{15} \cdot A_{10}} < 5$$

and the cantilever 16 fulfills at least the condition $$0.5 < \frac{J_{16x}}{m_{16} \cdot A_{10}} < 5.$$

According to a further embodiment of the invention, the cantilevers 15, 16 are additionally so embodied that each of the two first mass moments of inertia, $J_{15x}$, $J_{16x}$, amount to at least 0.01 kg $m^2$.

For the above mentioned case in which the measuring transducer is to be operated in a dual mode in which the measuring tube 10 executes both, at least at times, bending oscillations as well as also, at least at times, torsional oscillations, besides the respective mass moments of inertia, $J_{15x}$, $J_{16x}$, of each cantilever 15, 16 about the associated axes of rotation, $D_{15x}$, $D_{16x}$, also significantly of interest are those second mass moments of inertia, $J_{15z}$, $J_{16z}$, Of the cantilevers 15, 16 which oppose the accelerated twisting of the same about an, in each case, imaginary rotational axis, $D_{15z}$, $D_{16z}$, essentially parallel to the longitudinal axis L. For the measuring transducer shown in the example of an embodiment, in which the cantilevers align both with inlet and outlet tube pieces, as well as also with measuring tube and counteroscillator, the mass moments of inertia, $J_{15z}$, $J_{16z}$, correspond essentially to one of the three principle moments of inertia of the respective cantilever 15, 16 and the rotational axis, $D_{15z}$, $D_{16z}$, essentially to, in each case, the associated principle axis of inertia. According to a further embodiment of the invention, the cantilevers 15, 16 are therefore so dimensioned that a ratio $J_{15x}/J_{15z}$, $J_{16x}/J_{16z}$ of the, in each case, first mass moment of inertia, $J_{15x}$, $J_{16x}$, of each of the cantilevers 15, 16 to its respective second mass moment of inertia, $J_{15z}$, $J_{16z}$, is smaller than 5, especially smaller than 2. At least for the above described case that each of the two mass moments of inertia, $J_{15x}$, $J_{16x}$, amounts at least to 0.01 kg m², also each of the two second mass moments of inertia $J_{15z}$, $J_{16z}$, amounts to at least about 0.01 kg m².

The cantilevers 15, 16 are, in a further embodiment of the invention, additionally so embodied that they exhibit a lowest bending stiffness about the respective axis of rotation $D_{15x}$, $D_{16x}$, which is larger than a comparable bending stiffness $E_{11} \cdot I_{11}$ of the inlet tube piece 11 and a corresponding bending stiffness $E_{12} \cdot I_{12}$ of the outlet tube piece 12 with reference to the same axis of rotation $D_{15x}$, respectively $D_{16x}$. For the above mentioned case in which also the corresponding lengths $L_{15}$, $L_{16}$ of the respective cantilevers 15, 16 is selected to be clearly smaller than the corresponding length, $L_{11}$, of the inlet tube piece 11 and the corresponding length, $L_{12}$, of the outlet tube piece 12, than it is also possible to assure, without more, that the corresponding spring constant of each of the cantilevers 15, 16 is always greater than the above mentioned spring constant of the inlet tube piece 11 proportional to $E_{11} \cdot I_{11}/L^3_{11}$ and the corresponding spring constant ($\sim E_{12} \cdot I_{12}/L^3_{12}$) of the outlet tube piece 12.

For optimum adapting of the required masses, mass moments of inertia and/or bending stiffnesses of the cantilevers 15, 16 to the actually predetermined conditions, especially as given by the measuring tube 10 and/or the counteroscillator 20, additionally or alternatively to the abovementioned annular groove, also longitudinal grooves 15i, 15j can be provided in the respective cantilevers. As indicated in FIGS. 7a and 7b on the basis of the cantilever 15, these longitudinal grooves are essentially aligned with the longitudinal axis L. In such case, as can be recognized without difficulty from the above explanations, the measuring transducer of the invention distinguishes itself by having a multiplicity of possibilities for adjustment or tuning which enable those skilled in the art, especially also after a specification of the outer or inner installation dimensions, to achieve a high-quality compensation of transverse forces produced in the measuring tube 10 and, as the case may be, in the counteroscillator 20. The above mentioned parameters, especially the masses $m_{15}$, $m_{16}$, the first and second moments of inertia $J_{15x}$, $J_{16x}$, as well as also the ratios derived there from can, in such case, without more, be correspondingly adapted within wide ranges to the nominal diameter DN actually provided for the measuring tube 10 as well as also correspondingly for the installation length provided for the measuring transducer.

For further improving the oscillatory properties of the measuring transducer and, along therewith, for further improving accuracy of measurement, in a further embodiment of the invention, it is additionally provided that at least two connection lines 601, 602 of the connection lines 60 carrying current, at least at times during operation, and affixed, as required, also to the counteroscillator in suitable manner, are, in each case, secured to at least one of the two cantilevers 15, 15, as shown schematically in FIG. 2. This can, for example, be connection lines of a line pair provided for the exciter mechanism, and/or a connection line of a line pair provided for the sensor arrangement. Additionally, it is possible also to hold both connection lines of such a line pair on one and the same cantilever. It can, however, also be quite advantageous, both as regards possible induction of disturbance voltages in connection lines carrying current during operation as well as also with regard to possible mechanical damping effects of the connection lines on the inner part, to hold a first connection line of such a line pair on the first cantilever 15 and a second connection line 602 of the same line pair on the second cantilever 16, this being illustrated in FIG. 2. The affixing of the connection lines 601, 602 to the respective cantilevers can be done, for example, again, at least in part, especially predominantly, adhesively. As already mentioned, the connection lines 60 can also be bound together, at least in part, also in pairs, especially also as twisted pairs, or also as coaxial cable. Therefore, according to a further embodiment of the invention, at least two of the connection lines are bound together as a line pair and the at least one line pair is secured to the inner part, especially to at least one of the cantilevers 15, 16. This can, for example, be done in such a manner that some of the connection lines are at least sectionally directly affixed to the cantilever, while then, again, other connection lines are held, for example, also by means of cable ties. Equally, however, also each of the connection lines possibly secured to the cantilever can itself be secured adhesively, as least sectionally, to the cantilever.

The connection lines are, in a further embodiment of the invention, in such case, routed on the inner part in such a manner that line sections 610'' routed along the counteroscillator and possibly affixed at least pointwise thereon, essentially align with line sections 601''' routed along the cantilever and likewise affixed thereon. For the above-described case, in which measuring tube 10 and counteroscillator 20 execute, at least at times, mutually coplanar bending oscillations in a common oscillation plane, here defined by the principal axes of inertia T1, T2, in a further embodiment of the invention, it is additionally provided that the at least one connection line secured to the cantilever is affixed, at least in part, outside of the common plane of oscillation of measuring tube and counteroscillator, especially along a line aligned with the above-mentioned, neutral fiber of the counteroscillator undergoing bending oscillations.

As already mentioned, at least one, essentially freely suspended section of each connection line extends between two tie-down points a1, a2, of which the first (a1) is located on the inner part carrying the connection line and the second (a2) on the transducer housing 30. For lessening damping forces possibly coupled into the inner part by the connection lines, in an embodiment of the invention, it is further provided that the respective two tie-down points a1, a2 are so arranged that a relative distance A' therebetween also remains essentially unchanged, or changes, at most, only insignificantly, while the measuring tube 10 is executing bending oscillations as above-described. This can be given to a sufficient degree, for example in the region of the coupling zones 11# and 12#, especially, however, on the cantilevers 15, 16. Considering that the inner part formed, in the manner above described, by means of the measuring tube, the counteroscillator, the two cantilevers, as well as the inlet- and outlet-tube pieces can be dimensioned in such a manner that during operation each of the two cantilevers has at least one rest point, which remains at least laterally essentially locationally fixed in an associated, static rest position, even in the face of laterally moved, associated coupling zones, such rest points or quiet regions immediately surrounding these, of the cantilever are suited for the affixing of the connection lines in position as the first tie-down point. On the one hand, it is possible in this way that the respective connection line is subjected itself to no or only very little mechanical loadings, and, on the other hand, produces, at least in this region, no damping forces reacting to any mentionable degree on the inner part. For reducing damping forces possibly caused by the connecting lines, reacting on the vibrating inner part, especially asymmetrically as regards the mentioned Coriolis mode, it is, therefore, provided in a further development of the invention, that the at least one connection line secured to the cantilever is secured, at least in part, on its at least one rest point or at least within a quiet region immediately surrounding such. Of special advantage, in such case, is to place the first tie-down point in such a manner on the cantilever that it essentially coincides with at least one rest point. For minimizing the length of the freely suspended section of the so secured connection line, a further development of the invention provides that the second tie-down point for this connection line is arranged on the transducer housing vis-à-vis the first tie-down point.

As already mentioned, the measuring transducer can include, besides the oscillation sensors provided for registering vibrations of the measuring tube, as disclosed, for example, also in EP-A 831 306, U.S. Pat. No. 7,040,179, U.S. Pat. No. 5,736,653, U.S. Pat. No. 5,381,697 or WO-A 01/02 816, yet further sensors 80 arranged on the inner part and serving especially for registering rather secondary measured variables, such as e.g. temperature, acceleration, strain, stress, etc. The connections correspondingly provided therefor can be guided then in the same manner as the connection lines for the sensor arrangement and/or exciter mechanism, possibly bound together therewith into a bundled line. Accordingly, in a further embodiment of the invention, it is additionally provided that the measuring transducer has at least one temperature sensor affixed to the counteroscillator and/or at least one strain sensor affixed to the counteroscillator, as well as connection lines 603 therefor. Especially, it is further provided that, of the connection lines for the temperature sensor and/or the strain sensor, at least one, especially also all, is/are secured, at least in part, to at least one of the two cantilevers; especially, in the same manner as the connection lines for the exciter mechanism and/or the sensor arrangement.

The measuring transducer of the invention is distinguished by an asymmetry reduced to a considerable degree as regards a damping force per unit length arising along the oscillating inner part and is, in such case, suited both for measuring tubes with rather small nominal diameters DN, especially in the range of smaller than 10 mm, as well as also especially for use in pipelines having a caliber of more than 50 mm and along therewith also for measuring tubes with nominal diameters of essentially more than 40 mm. For those skilled in the art, there is, moreover, no difficulty in suitably modifying the variants shown here by way of example as regards the guiding and/or affixing of the connection lines in the manufacture of such measuring transducers suitably in accordance with the actually existing conditions, especially also by a somewhat changed line routing in the sense of the teachings of the invention.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

The invention claimed is:

1. A measuring transducer of the vibration-type for a medium flowing in a pipeline, comprising:
 a measuring tube having an inlet tube piece on an inlet end and an outlet tube piece on an outlet end, said measuring tube vibrating at least at times during operation and serving for conveying the medium, and communicating with the pipeline via said inlet tube piece and said outlet tube piece;
 a counteroscillator affixed to said measuring tube at said inlet end to form a first coupling zone and at said outlet end to form a second coupling zone;
 a sensor arrangement held, at least partly, at said counteroscillator for registering oscillations at least of said measuring tube;
 an exciter mechanism held, at least partly, at said counteroscillator for driving at least said measuring tube;
 a transducer housing affixed to said inlet tube piece and to said outlet tube piece; and
 connection lines, at least two of said connection lines being routed at least sectionally along said counteroscillator and being secured, at least pointwise, thereto, as well as to said transducer housing, wherein:
 said connection lines are routed along said conteroscillator essentially symmetrically with respect to a principal axis of inertia of the inner part formed by means of said measuring tube and said counteroscillator, at least one of said connection lines secured to the counteroscillator as well as to the transducer housing being connected to the exciter mechanism.

2. The measuring transducer as claimed in claim 1, wherein:
 said exciter mechanism includes at least one coil coupled mechanically with said counteroscillator, and said at least one of said connection lines secured at least pointwise to said transducer housing and at least pointwise to an inner part of said measuring transducer is connected to said at least one coil of said exciter mechanism.

3. The measuring transducer as claimed in claim 2, wherein:
 said at least one coil of said exciter mechanism is coupled rigidly with said counteroscillator.

4. The measuring transducer as claimed in claim 1, wherein:
 at least one of said connection lines secured to said counteroscillator as well as to said transducer housing is connected to said sensor arrangement.

5. The measuring transducer as claimed in claim 1, wherein:
 said sensor arrangement includes at least one coil coupled mechanically with said counteroscillator, and said at least one of said connection lines secured at least pointwise to said transducer housing and at least pointwise to an inner part of said measuring transducer is connected to said at least one coil of said sensor arrangement.

6. The measuring transducer as claimed in claim 5, wherein:
said at least one coil of said sensor arrangement is coupled rigidly with said counteroscillator.

7. The measuring transducer as claimed in claim 6, wherein:
a section of each of said connection lines extends freely suspended between two mutually spaced tie-down points pointwise affixing each connection line, of which a first tie-down point is arranged on the inner part of said measuring transducer and a second tie-down point is arranged on said transducer housing.

8. The measuring transducer as claimed in claim 7, wherein:
said section of said at least one connection line extending between the two tie-down points is routed essentially freely suspended; and/or
said section of the at least one connection line extending between the two tie-down points is secured essentially free of tensile stresses.

9. The measuring transducer as claimed in claim 8, wherein:
the two tie-down points are so arranged, that a relative distance therebetween also remains essentially unchanged, even when said measuring tube is vibrating; and/or
said section of the at least one connection line extending between the two tie-down points is secured to be lastingly essentially free of tensile stresses.

10. The measuring transducer as claimed in claim 1, wherein:
at least said connection lines are routed in other portions of their extent also along an inner wall surface of said transducer housing and are affixed at least pointwise thereto; and/or
said measuring tube and said counteroscillator oscillate, at least at times and/or in part, during operation laterally in a driving-mode, in which they execute essentially coplanar bending oscillations in a common plane of oscillation; and/or
said measuring tube executes, at least at times during operation, bending oscillations about a bending oscillation axis, which connects said two coupling zones with one another.

11. The measuring transducer as claimed in claim 1, wherein:
said measuring tube and said counteroscillator oscillate, at least at times and/or in part, during operation laterally in a driving mode, in which they execute essentially coplanar bending oscillations in a common plane of oscillation; and
said connection lines are affixed to said counteroscillator, at least in part along a neutral fiber of said counteroscillator essentially non-distorting while said counteroscillator is executing bending oscillations.

12. The measuring transducer as claimed in claim 11, wherein:
said connection lines are affixed to said counteroscillator, predominantly along a neutral fiber of said counteroscillator essentially non-distorting while said counteroscillator is executing bending oscillations.

13. The measuring transducer as claimed in claim 1, wherein:
said measuring tube and said counteroscillator oscillate, at least at times and/or in part, during operation laterally in a driving-mode, in which they execute essentially coplanar bending oscillations in a common plane of oscillation, and said connection lines are affixed to said counteroscillator, at least in part, outside of the common plane of oscillation of said measuring tube and said counteroscillator.

14. The measuring transducer as claimed in claim 1, wherein:
each of said measuring tube and said counteroscillator execute, at least at times during operation, bending oscillations about a bending oscillation axis, which connects said two coupling zones with one another; and
said at least one connection line secured to the two tie-down points is affixed to said counteroscillator, at least in part, especially predominantly, along a neutral fiber of said counteroscillator essentially non-distorting while said counteroscillator executes bending oscillations.

15. The measuring transducer as claimed in claim 1, wherein:
said measuring tube is essentially straight.

16. The measuring transducer as claimed in claim 15, wherein:
said measuring tube and said counteroscillator are directed essentially coaxially with one another; and/or
said measuring tube executes, at least at times during operation, torsional oscillations about a torsion oscillation axis essentially parallel with the bending oscillation axis.

17. The measuring transducer as claimed in claim 1, further comprising:
a first cantilever coupled with said measuring tube on said inlet side thereof; and
a second cantilever coupled with said measuring tube on said outlet side thereof.

18. The measuring transducer as claimed in claim 17, wherein:
said first cantilever has a center of mass lying in the region of said inlet tube piece;
said second cantilever has a center of mass lying in the region of said outlet tube piece; and/or
each of said two cantilevers executes, at least at times during operation, rotational oscillations about an axis of rotation extending essentially transversely to said bending oscillation axis.

19. The measuring transducer as claimed in claim 18, wherein:
said coupling zones are moved, at least at times when said measuring tube is vibrating, laterally out of a static rest position; and/or
each of said two cantilevers executes, as a result of a lateral movement of said coupling zones, rotational oscillations about an axis of rotation extending essentially transversely to said bending oscillation axis.

20. The measuring transducer as claimed in claim 19, wherein:
each of said two cantilevers has at least one rest point, or a quiet region surrounding such which, even in the case of lateral movement of said coupling zones, remains essentially locationally fixed in a static rest position belonging to it and/or maintains a relative distance to a region of said transducer housing removed both from said inlet tube piece and also from said outlet tube piece; and/or
a section of each of said connection lines extends freely suspended between two mutually spaced tie-down points, in each case pointwise affixing such connection line, of which a first tie-down point is arranged on one of said cantilevers and a second tie-down point is arranged vis-à-vis on said transducer housing.

21. The measuring transducer as claimed in claim 18, wherein:
all connection lines are secured to the same cantilever; and/or
all of the connection lines are secured to one of said two cantilevers; and/or
at least one of said connection lines is secured to each of said two cantilevers.

22. The measuring transducer as claimed in claim 18, wherein:
said measuring tube and said counteroscillator oscillate, at least at times and/or in part, during operation laterally in a driving-mode, in which they execute essentially coplanar bending oscillations in a common plane of oscillation, and at least one of said connection lines is affixed to said cantilever, at least in part, outside of the common plane of oscillation of said measuring tube and said counteroscillator.

23. The measuring transducer as claimed in claim 22, wherein:
all of said connection lines are affixed to said cantilever, at least in part, outside of the common plane of oscillation of said measuring tube and said counteroscillator.

24. The measuring transducer as claimed in claim 18, wherein:
none of said connection lines is secured to both of said two cantilevers.

25. The measuring transducer as claimed in claim 18, wherein:
each of said cantilevers is affixed, at least in part, directly to said counteroscillator; and/or
each of said cantilevers is formed by means of a sleeve inserted onto said counteroscillator; and/or
each of said two cantilevers has a mass, which is at least equal to the mass of said counteroscillator ; and/or
each of said two cantilevers has a mass, which is smaller than 5-times the mass of said counteroscillator; and/or
each of said two cantilevers has an essentially tubular or sleeve shape.

26. The measuring transducer as claimed in claim 1, wherein:
a section of each of said connection lines extends freely suspended between two mutually spaced tie-down points, in each case pointwise affixing such connection line, of which a first tie-down point is arranged on one of said cantilevers and a second tie-down point is arranged vis-à-vis on said transducer housing.

27. The measuring transducer as claimed in claim 26, wherein:
said connection lines are affixed, at least in part, adhesively to said cantilever.

28. The measuring transducer as claimed in claim 1, wherein:
at least said at least one connection line secured between said two tie-down points carries electrical current, at least at times, during operation; and/or
said measuring tube is surrounded at least in part by said counteroscillator; and/or
said counteroscillator is essentially tubular; and/or
said measuring tube, inlet tube piece and outlet tube piece are formed by segments of a single, one-piece tube; and/or
said inlet tube piece and said outlet tube piece are essentially straight.

29. The measuring transducer as claimed in claim 1, further comprising:
at least one temperature sensor affixed to said counteroscillator as well as to said connection lines therefor; and
at least one of said connection lines secured to said counteroscillator as well as to said transducer housing is connected to said at least one temperature sensor.

30. The measuring transducer as claimed in claim 1, wherein:
said connection lines are routed along said counterosicllator essentially mirror symmetrically with respect to at least one principal axis of inertia of said counteroscillator.

31. The use of a measuring transducer as claimed in claim 1, in an inline measuring device for measuring and/or monitoring at least one parameter of a medium flowing in a pipeline.

* * * * *